United States Patent [19]
Jacob et al.

[11] Patent Number: 5,470,275
[45] Date of Patent: Nov. 28, 1995

[54] METHOD AND APPARATUS FOR CONTROLLING FUME HOOD FACE VELOCITY USING VARIABLE BY-PASS RESISTANCE

[75] Inventors: Steven D. Jacob, Roselle; James J. Coogan, Des Plaines; Stefan G. Petras, Lindenhurst, all of Ill.

[73] Assignee: Landis & Gyr Powers, Inc., Buffalo Grove, Ill.

[21] Appl. No.: 42,824

[22] Filed: Apr. 5, 1993

[51] Int. Cl.⁶ .................................................. B08B 15/02
[52] U.S. Cl. ................................. 454/61; 454/59
[58] Field of Search .................. 454/57, 58, 59, 454/61

[56] References Cited

U.S. PATENT DOCUMENTS

| | | | |
|---|---|---|---|
| 4,893,551 | 1/1990 | Sharp et al. | 454/59 X |
| 4,927,438 | 5/1990 | Mears et al. | |
| 4,934,256 | 6/1990 | Moss et al. | |
| 4,982,605 | 1/1991 | Oram et al. | 73/204.19 |
| 5,092,227 | 3/1992 | Ahmed et al. | 454/61 |

Primary Examiner—Harold Joyce
Attorney, Agent, or Firm—Greer, Burns & Crain, Ltd.

[57] ABSTRACT

A fume hood controller and method which compensates for resistance to air flow through a by-pass opening that exists due to a grille or louvre overlying the by-pass opening.

15 Claims, 15 Drawing Sheets

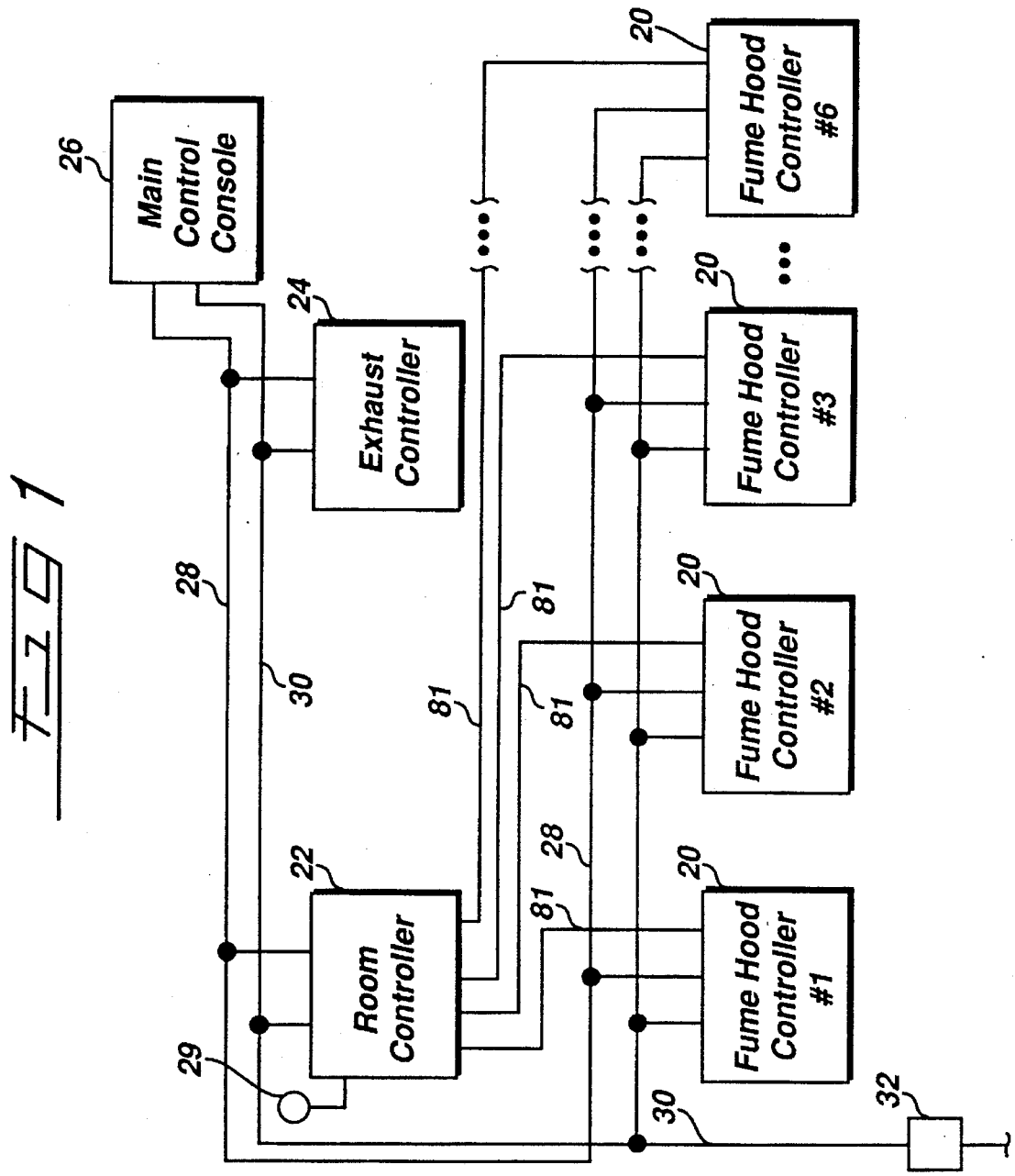

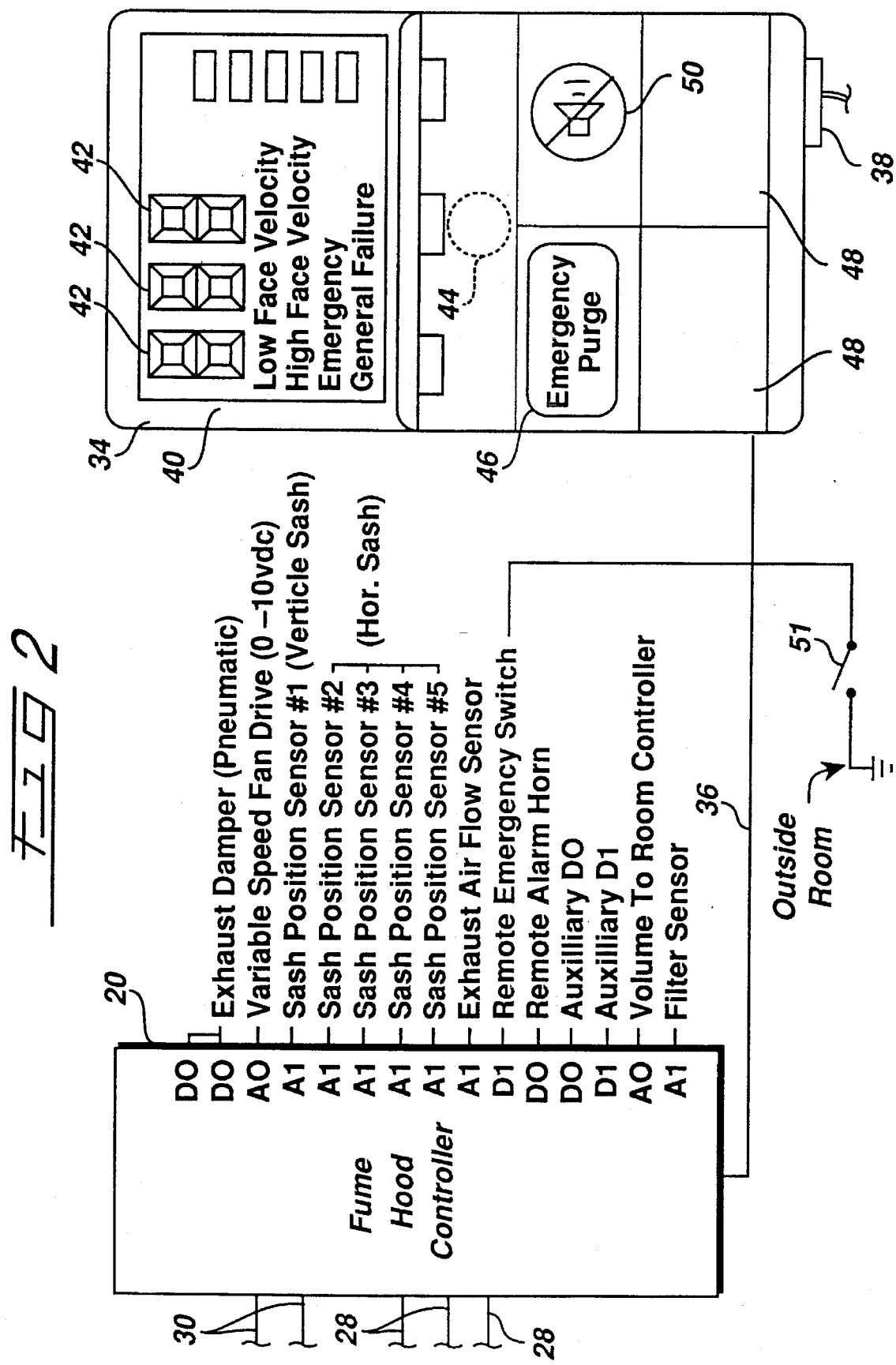

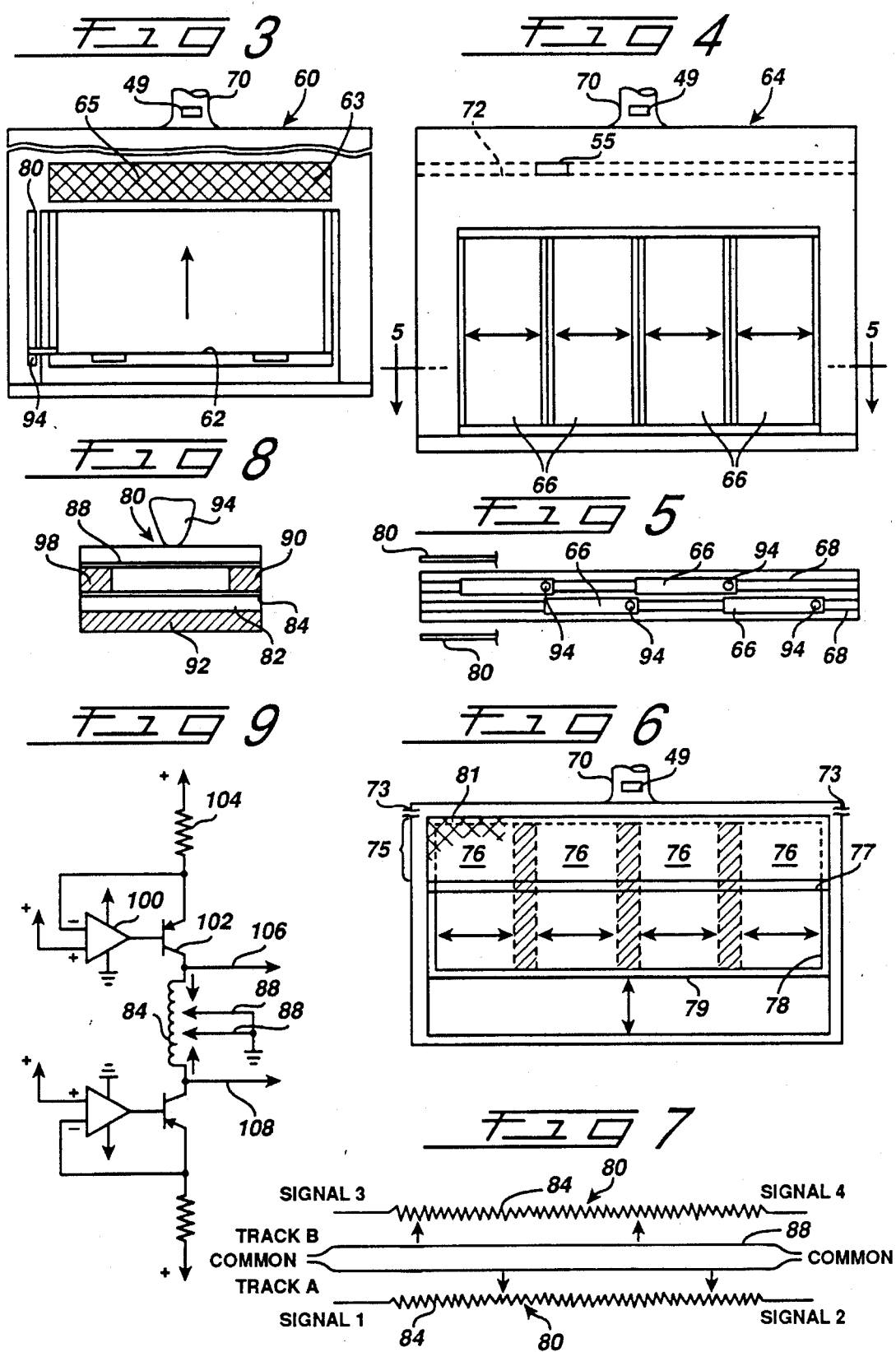

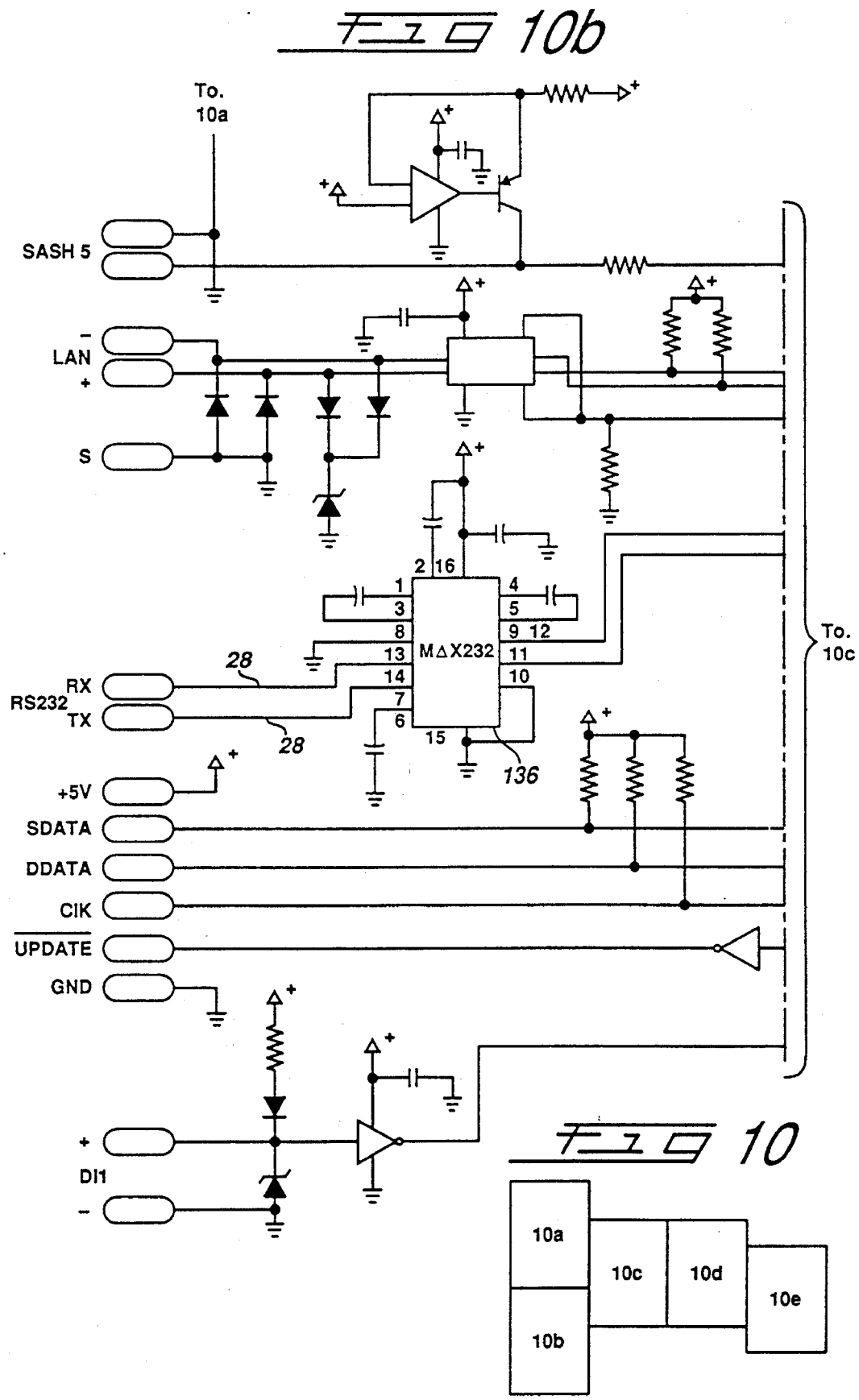

METHOD AND APPARATUS FOR CONTROLLING FUME HOOD FACE VELOCITY USING VARIABLE BY-PASS RESISTANCE

The present invention relates generally to the control of the ventilation of laboratory fume hoods, and more particularly to an improved method and apparatus for controlling the open face velocity of a fume hood that has a by-pass area that has a grille or louver structure overlying the by-pass area, and which by-pass area is at least partially covered by opening the fume hood doors.

Fume hoods are utilized in various laboratory environments for providing a work place where potentially dangerous chemicals are used, with the hoods comprising an enclosure having moveable doors at the front portion thereof which can be opened in various amounts to permit a person to gain access to the interior of the enclosure for the purpose of conducting experiments and the like. The enclosure is typically connected to an exhaust system for removing any noxious fumes so that the person will not be exposed to them while performing work in the hood.

Fume hood controllers which control the flow of air through the enclosure have become more sophisticated in recent years, and are now able to more accurately maintain the desired flow characteristics to efficiently exhaust the fumes from the enclosure as a function of the desired average face velocity of the opening of the fume hood. The average face velocity is generally defined as the flow of air into the fume hood per square foot of open face area of the fume hood, with the size of the open face area being dependent upon the position of one or more moveable doors that are provided on the front of the enclosure or fume hood, and in most types of enclosures, the amount of by-pass opening that is provided when the door or doors are closed.

The fume hoods are exhausted by an exhaust system that includes a blower that is capable of being driven at variable speeds to increase or decrease the flow of air from the fume hood to compensate for the varying size of the opening or face. Alternatively, there may be a single blower connected to the exhaust manifold that is in turn connected to the individual ducts of multiple fume hoods, and dampers may be provided in the individual ducts to control the flow from the individual ducts to thereby modulate the flow to maintain the desired average face velocity.

The doors of such fume hoods can be opened by raising them vertically, often referred to as the sash position, or some fume hoods have a number of doors that are mounted for sliding movement in typically two sets of vertical tracks. There are even doors that can be moved horizontally and vertically, with the tracks being mounted in a frame assembly that is vertically movable.

Very recent improvements in controlling the operation of fume hoods have been made and are disclosed in the following patents and applications that have been assigned to the same assignee as the present invention: Apparatus for Controlling the Ventilation of a Laboratory Fume Hood by Ahmed et. al, Ser. No.: 52370; Apparatus for Determining the Position of a Moveable Structure Along a Track by Egbers et. al, Ser. No.: 52496; A System for Controlling the Differential Pressure of a Room Having Laboratory Fume Hoods by Ahmed et. al, Ser. No. 52497; A Method and Apparatus for Determining the Uncovered Size of an Opening Adapted to be Covered by Multiple Moveable Doors, by Ahmed et. al, Ser. No. 52498; and Laboratory Fume Hood Control Apparatus Having Improved Safety Considerations, by Ahmed, Ser. No.

While the above referenced patents and applications are directed to improved controllers for fume hoods, the existence of grilles or baffles which cover those types of fume hoods which have by-pass areas have been found to affect the operational control of such fume hoods. Because the presence of such grilles or baffles necessarily affect the flow of air through the grilles, the use of the calculated overall area of the by-pass area alone may not provide an accurate parameter in which to control the flow of air through the area that is uncovered by the doors of the fume hood.

Accordingly, it is a primary object of the present invention to provide an improved fume hood controller and method for accurately controlling the flow of air through the uncovered area of the fume hood having a by-pass, and for compensating for the presence of grilles or baffles which may cover the by-pass area.

It is another object of the present invention to provide such an improved fume hood controller that is easily adaptable for use in controlling most commercially available fume hoods of the type in which changing the position of the sash doors changes the effective size of the by-pass area, and accurately controls the flow of air through the uncovered opening to the fume hood, taking into consideration the number of sash doors, the sizes of the sash doors and any by-pass area which may have a grille or baffle overlying the by-pass area.

A more specific object of the present invention is to provide such a controller and method which utilizes a conductance factor to compensate for any resistance to flow of air through a baffle or grille covering a by-pass area, so that more accurate control of the fume hood can be achieved.

These and other objects will become apparent upon reading the following detailed description of the present invention, while referring to the attached drawings, in which:

FIG. 1 is a schematic block diagram of apparatus of the present invention shown integrated with a room controller of a heating, ventilating and air conditioning monitoring and control system of a building;

FIG. 2 is a block diagram of a fume hood controller, shown connected to an operator panel, the latter being shown in front elevation;

FIG. 3 is a diagrammatic elevation of the front of a representative fume hood having a vertically operable sash door, and a by-pass opening located above the front face, with the by-pass opening having a grille covering the same;

FIG. 4 is a diagrammatic elevation of the front of a representative fume hood having horizontally operable sash doors;

FIG. 5 is a cross section taken generally along the line 5—5 of FIG. 4;

FIG. 6 is a diagrammatic elevation of the front of a representative combination sash fume hood having horizontally and vertically operable sash doors;

FIG. 7 is an electrical schematic diagram of a plurality of door sash position indicating switching means;

FIG. 8 is a cross section of the door sash position switching means;

FIG. 9 is a schematic diagram of electrical circuitry for determining the position of sash doors of a fume hood;

Figure 11:
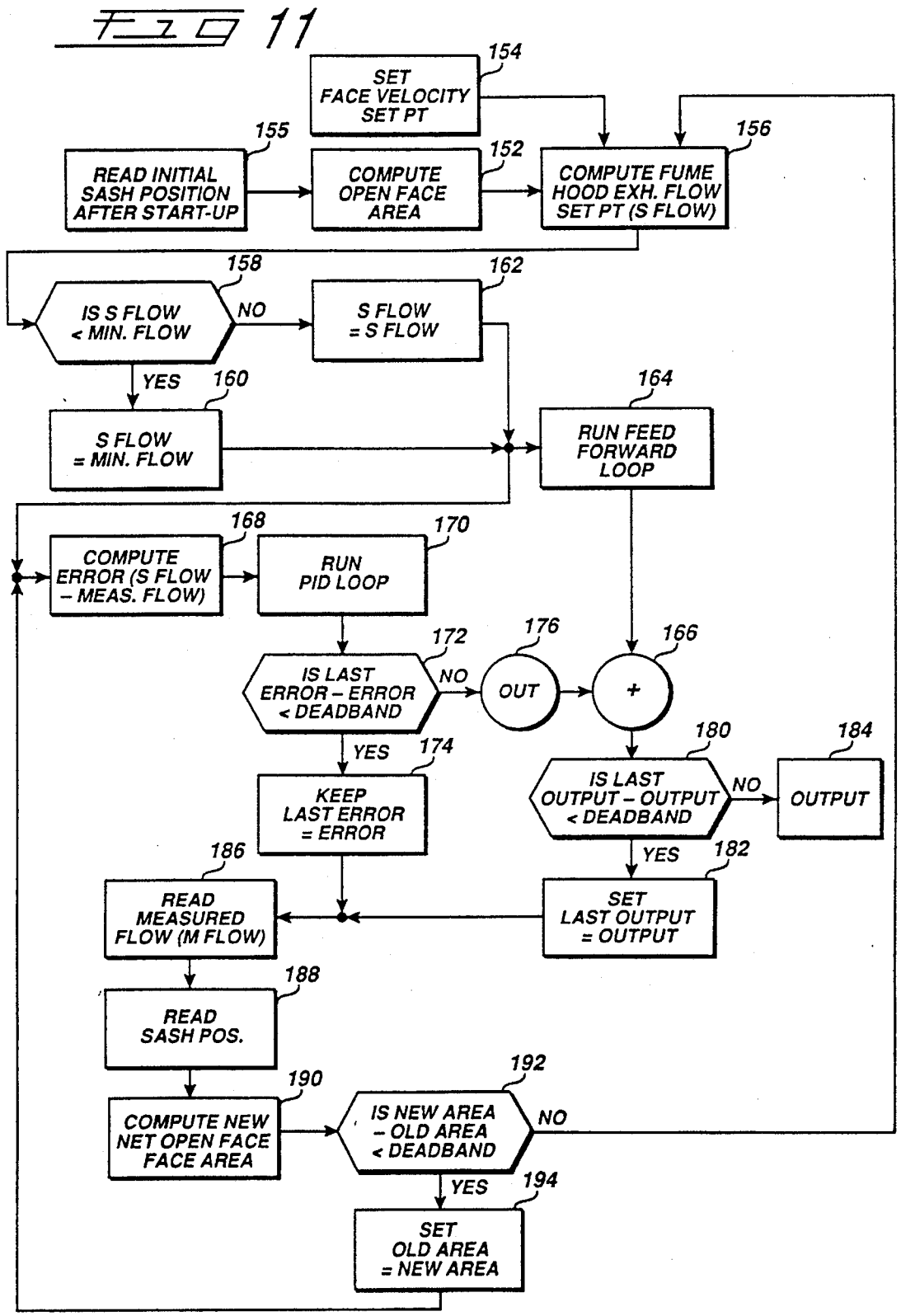
Figure 12:
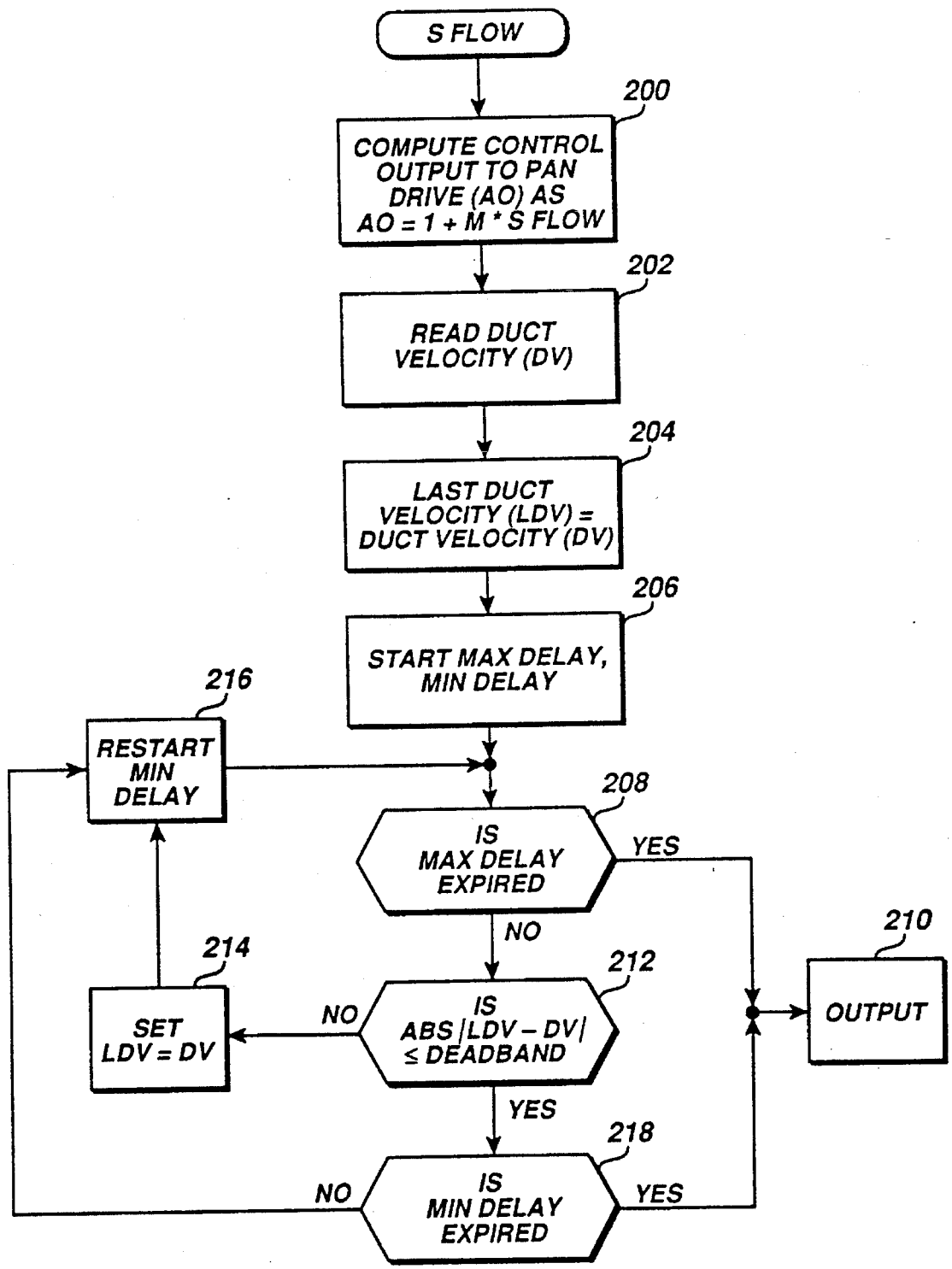
Figure 13:
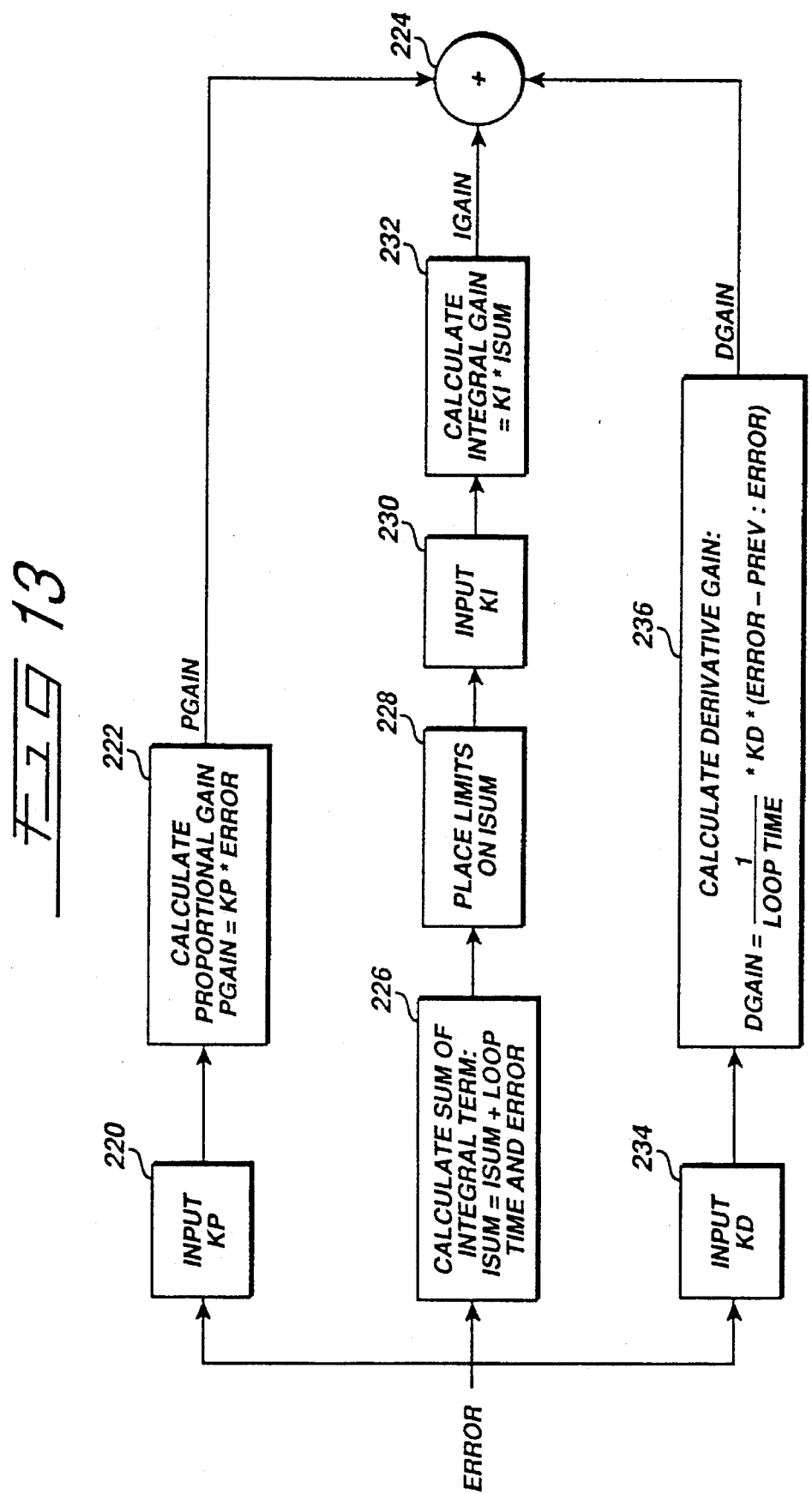
Figure 14:
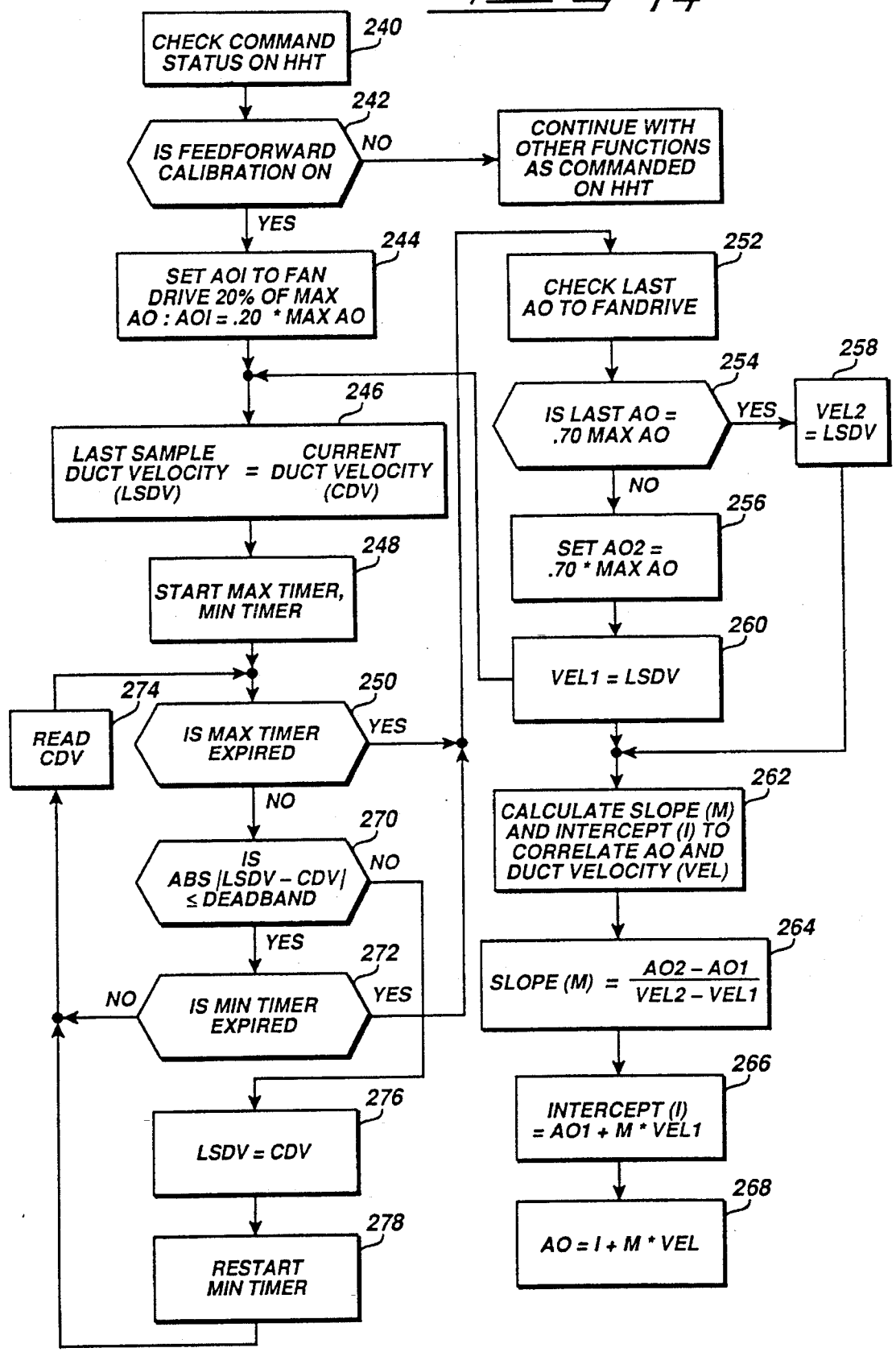
Figure 15:
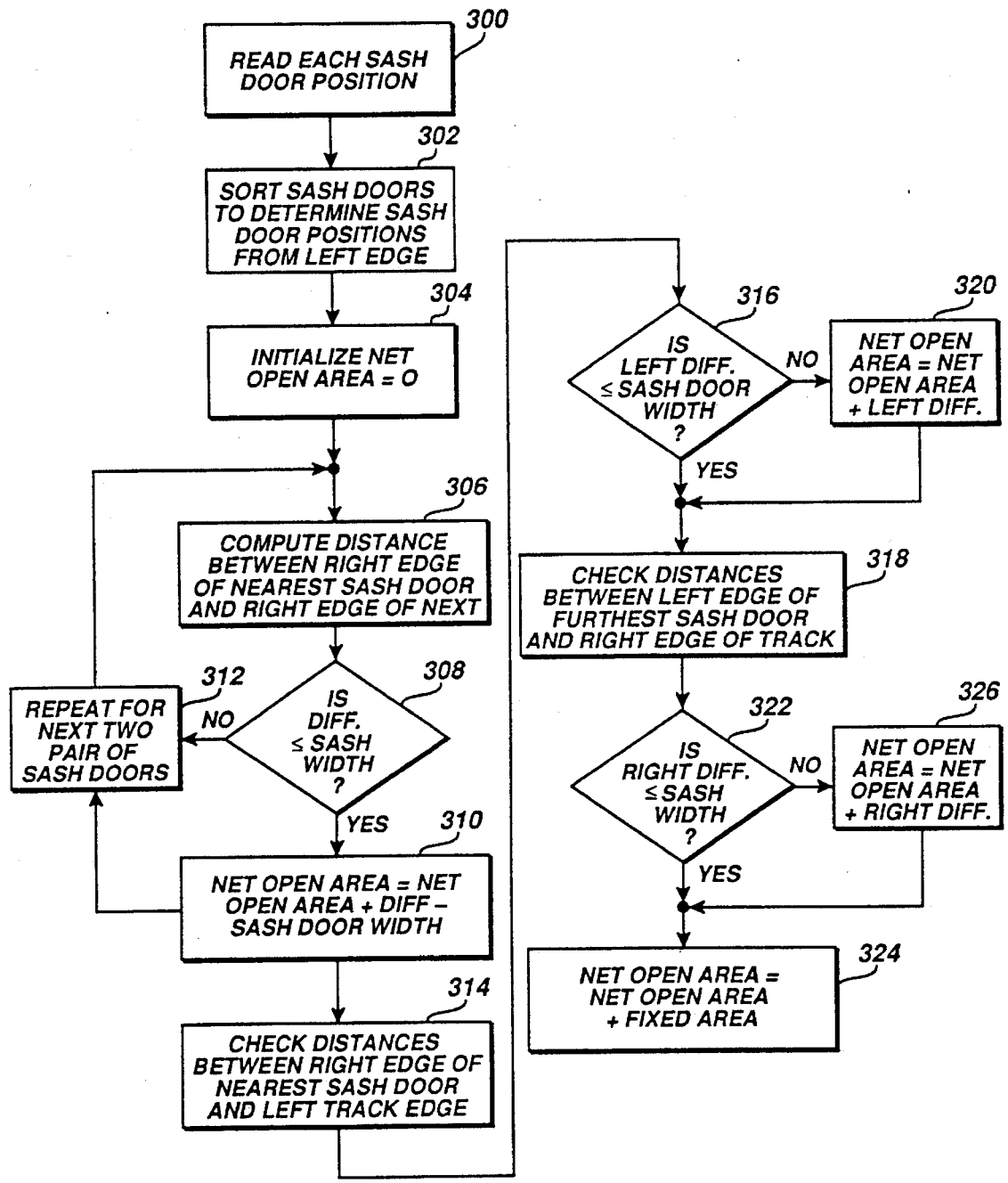
Figure 16:
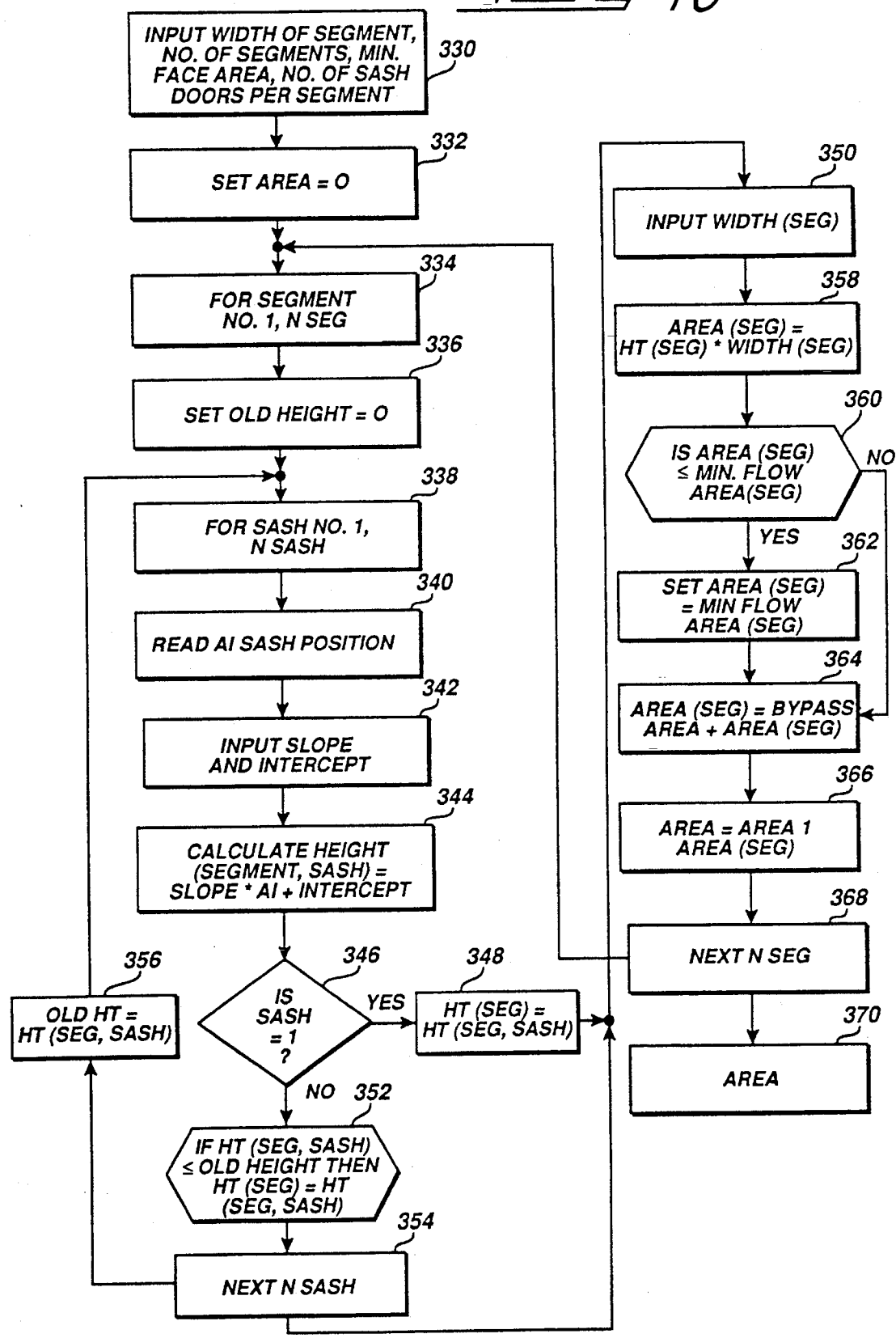
Figure 17:
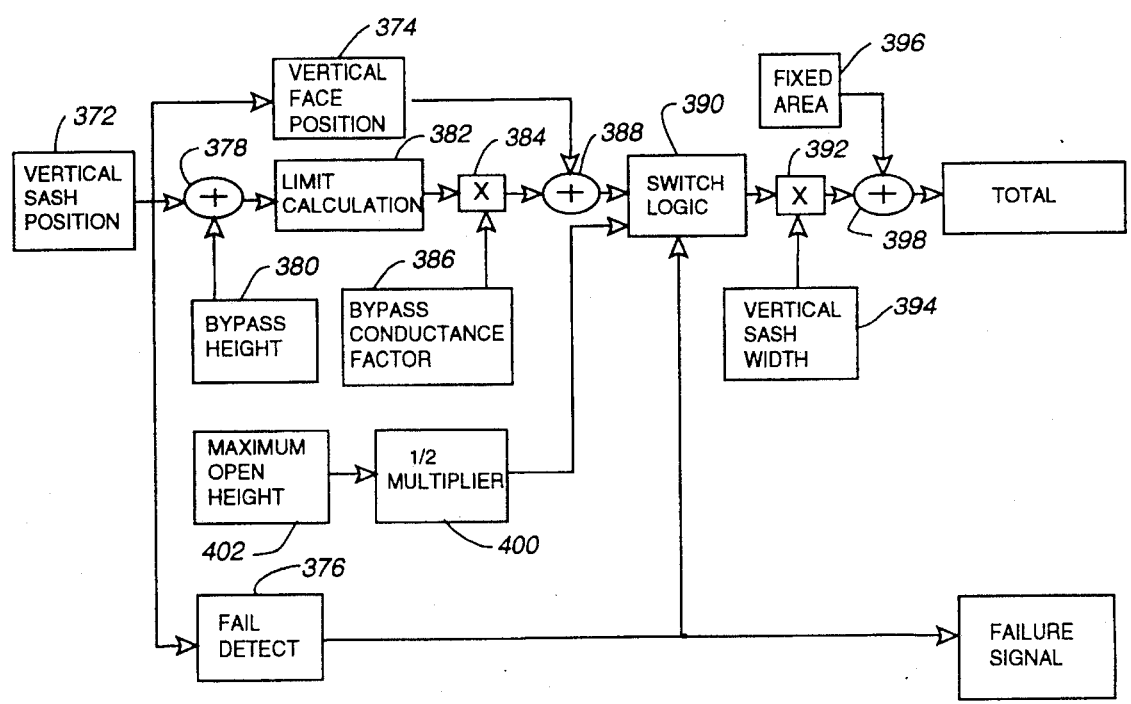

FIGS. 10a, 10b, 10c, 10d and 10e, which if connected together, comprise the schematic diagram of the electrical circuitry for the fume hood controller means embodying the present invention;

FIG. 11 is a flow chart of the general operation of the fume hood controller;

FIG. 12 is a flow chart of a portion of the operation of the fume hood controller, particularly illustrating the operation of the feed forward control scheme, which may be employed;

FIG. 13 is a flow chart of a portion of the operation of the fume hood controller, particularly illustrating the operation of the proportional gain, integral gain and derivative gain control schemes;

FIG. 14 is a flow chart of a portion of the operation of the fume hood controller, particularly illustrating the operation of the calibration of the feed forward control scheme;

FIG. 15 is a flow chart of a portion of the operation of the fume hood controller embodying the present invention, particularly illustrating the operation of the calculation of the uncovered opening for a number of horizontally moveable sash doors; and, FIG. 16 is a flow chart of a portion of the operation of the fume hood controller embodying the present invention, particularly illustrating the operation of the calculation of the uncovered opening for a number of horizontally and vertically moveable sash doors; and, FIG. 17 is a flow chart of a portion of the operation of the fume hood controller embodying the present invention, particularly illustrating the operation of the calculation of the uncovered opening for a vertically moveable sash door in a fume hood having a by-pass opening with a grille overlying the same.

DETAILED DESCRIPTION

It should be generally understood that a fume hood controller controls the flow of air through the fume hood in a manner whereby the effective size of the total opening to the fume hood, including the portion of the opening that is not covered by one or more sash doors will have a relatively constant average face velocity of air moving into the fume hood. This means that regardless of the area of the uncovered opening, an average volume of air per unit of surface area of the uncovered portion will be moved into the fume hood. This protects the persons in the laboratory from being exposed to noxious fumes or the like because air is always flowing into the fume hood, and out of the exhaust duct, and the flow is preferably controlled at a predetermined rate of approximately 75 to 150 cubic feet per minute per square feet of effective surface area of the uncovered opening. In other words, if the sash door or doors are moved to the maximum open position whereby an operator has the maximum access to the inside of the fume hood for conducting experiments or the like, then the flow of air will most likely have to be increased to maintain the average face velocity at the predetermined desired level.

Some fume hoods have a by-pass opening through which air is moved and expelled through the exhaust duct even when the sash doors are closed. Moreover, the effective size of the by-pass opening is often reduced when the sash doors are opened, particularly when the sash doors are opened vertically, and the by-pass opening is located above the sash doors. For aesthetic purposes, a grille or baffle is often located to cover the by-pass opening, and such a grille necessarily provides some resistance to air flow through the by-pass opening.

Broadly stated, the present invention is directed to an improved fume hood controlling apparatus that is adapted to provide many desirable operational advantages for persons who use the fume hoods to perform experiments or other work, and also for the operator of the facility in which the fume hoods are located. The apparatus embodying the present invention provides extremely rapid, accurate and effective control of the average face velocity of the fume hood, and achieves and maintains the desired average face velocity within a few seconds after one or more doors which cover the front opening of the fume hood have been moved. This is achieved, at least in part, by the rapid calculation of the uncovered area of the opening of the fume hood, i.e., that area not covered by sash doors, frames, lips and the like, which calculation is repeated several times per second. The fume hood controller apparatus embodying the present invention includes a computing means, together with associated memory, which can be configured for horizontally and/or vertically moveable sash doors by inputting the necessary dimensions of the sash doors and other structural features, such as the upper lip height, frame widths and the like, as will be described.

Additionally, the determination of the volume of air that must be drawn through the exhaust duct by controlling the position of a damper or the speed of a blower that is necessary to provide a predetermined average face velocity through the uncovered area of the opening of the fume hood must take into consideration the volume of air that is being drawn through a by-pass opening if one is provided. It should be appreciated that any calculation of the total volume that is necessary to provide the desired average face velocity if based merely on the size of the uncovered opening and the uncovered by-pass opening may result in inaccuracies if the by-pass opening has a grille overlying the by-pass opening, because the grille may provide some resistance to air flow that would otherwise occur if the grille were not present.

Turning now to the drawings, and particularly FIG. 1, a block diagram is shown of several fume hood controllers 20 interconnected with a room controller 22, an exhaust controller 24 and a main control console 26. The fume hood controllers 20 are interconnected with the room controller 22 and with the exhaust controller 24 and the main control console 26 in a local area network illustrated by line 28 which may be a multiconductor cable or the like. The room controller, the exhaust controller 24 and the main control console 26 are typically part of the building main HVAC system in which the laboratory rooms containing the fume hoods are located. The fume hood controllers 20 are provided with power through line 30, which is at the proper voltage via a transformer 32 or the like.

The room controller 22 preferably is of the type which is at least capable of providing a variable air volume to the room, and may be a Landis & Gyr Powers System 600 SCU controller. The room controller 22 is capable of communicating over the LAN lines 28. The room controller preferably is a System 600 SCU controller and is a commercially available controller for which extensive documentation exists. The User Reference Manual, Part No. 125-1753 for the System 600 SCU controller is specifically incorporated by reference herein.

The room controller 22 receives signals via lines 81 from each of the fume hood controllers 20 that provides an analog input signal indicating the volume of air that is being exhausted by each of the fume hood controllers 20 and a comparable signal from the exhaust flow sensor that provides an indication of the volume of air that is being exhausted through the main exhaust system apart from the fume hood exhausts. These signals coupled with signals that are supplied by a differential pressure sensor 29 which indicates the pressure within the room relative to the reference space enable the room controller to control the supply of air that is necessary to maintain the differential pressure within the room at a slightly lower pressure than the reference space, i.e., preferably within the range of about 0.05 to about 0.1 inches of water, which results in the desirable lower pressure of the room relative to the reference space. However, it is not so low that it prevents persons inside the laboratory room from opening the doors to escape in the event of an emergency, particularly if the doors open outwardly from the room. Also, in the event the doors open inwardly, the differential pressure will not be so great that it will pull the door open due to excessive force being applied due to such pressure.

The sensor 29 is preferably positioned in a suitable hole or opening in the wall between the room and the reference space and measures the pressure on one side relative to the other. Alternatively, a velocity sensor may be provided which measures the velocity of air moving through the opening which is directly proportional to the pressure difference between the two spaces. Of course, a lower pressure in the room relative to the reference space would mean that air would be moving into the room which is also capable of being detected.

Referring to FIG. 2, a fume hood controller 20 is illustrated with its input and output connector ports being identified, and the fume hood controller 20 is connected to an operator panel 34. It should be understood that each fume hood will have a fume hood controller 20 and that an operator panel will be provided with each fume hood controller. The operator panel 34 is provided for each of the fume hoods and it is interconnected with the fume hood controller 20 by a line 36 which preferably comprises a multi-conductor cable having eight conductors. The operator panel has a connector 38, such as a 6 wire RJ11 type telephone jack for example, into which a lap top personal computer or the like may be connected for the purpose of inputting information relating to the configuration or operation of the fume hood during initial installation, or to change certain operating parameters if necessary. The operator panel 34 is preferably mounted to the fume hood in a convenient location adapted to be easily observed by a person who is working with the fume hood.

The fume hood controller operator panel 34 includes a liquid crystal display 40 which when selectively activated provides the visual indication of various aspects of the operation of the fume hood, including three digits 42 which provide the average face velocity. The display 40 illustrates other conditions such as low face velocity, high face velocity and emergency condition and an indication of controller failure. The operator panel may have an alarm 44 and an emergency purge switch 46 which an operator can press to purge the fume hood in the event of an accident. The operator panel has two auxiliary switches 48 which can be used for various customer needs, including day/night modes of operation. It is contemplated that night time mode of operation would have a different and preferably reduced average face velocity, presumably because no one would be working in the area and such a lower average face velocity would conserve energy. An alarm silence switch 50 is also preferably provided to extinguish an alarm.

Fume hoods come in many different styles, sizes and configurations, including those which have a single sash door or a number of sash doors, with the sash doors being moveable vertically, horizontally or in both directions. Additionally, various fume hoods have different amounts of by-pass flow, i.e., the amount of flow permitting opening that exists even when all of the sash doors are as completely closed as their design permits. Other design considerations involve whether there is some kind of filtering means included in the fume hood for confining fumes within the hood during operation. While many of these design considerations must be taken into account in providing efficient and effective control of the fume hoods, the apparatus can be configured to account for virtually all of the above described design variables, and effective and extremely fast control of the fume hood ventilation is provided.

Referring to FIG. 3, there is shown a fume hood, indicated generally at 60, which has a vertically operated sash door 62 which can be moved to gain access to the fume hood and which can be moved to the substantially closed position as shown. Fume hoods are generally designed so that even when a door sash such as door sash 62 is completely closed, there is still some amount of opening into the fume hood, such as opening 63, through which air can pass. This opening is generally referred to as the by-pass area and it can be determined so that its effect can be taken into consideration in controlling the flow of air into the fume hood. Some types of fume hoods have a by-pass opening that is located above the door sash while others are below the same. In some fume hoods, the first amount of movement of a sash door will increase the opening at the bottom of the door shown in FIG. 3, for example, but as the door is raised, it will merely cut off the by-pass opening so that the size of the total opening of the fume hood is maintained relatively constant for perhaps the first one-fourth amount of movement of the sash door 62 through its course of travel and ignoring any effect of a grille 65 which is provided to overlie the by-pass area.

Other types of fume hoods may include several horizontally moveable sash doors 66 such as shown in FIGS. 4 and 5, with the doors being movable in upper and lower pairs of adjacent tracks 68. When the doors are positioned as shown in FIGS. 4 and 5, the fume hood opening is completely closed and an operator may move the doors in the horizontal direction to gain access to the fume hood. Both of the fumes hoods 60 and 64 have an exhaust duct 70 which generally extends to an exhaust system which may be that of the HVAC apparatus previously described. The fume hood 64 also includes a filtering structure shown diagrammatically at 72, which filtering structure is intended to keep noxious fumes and other contaminants from exiting the fume hood into the exhaust system.

Referring to FIG. 6, there is shown a combination fume hood which has horizontally movable doors 76 which are similar to the doors 66, with the fume hood 74 having a frame structure 78 which carries the doors 76 in suitable tracks and the frame structure 78 is also vertically movable in the opening of the fume hood.

The illustration of FIG. 6 has portions removed as shown by the break lines 73 which is intended to illustrate that the height of the fume hood may be greater than is otherwise shown so that the frame structure 78 may be raised sufficiently to permit adequate access to the interior of the fume hood by a person. There is generally a by-pass area which is identified as the vertical area 75, and there is typically a top lip portion 77 which may be approximately 2 inches wide. This dimension is preferably defined so that its effect on the calculation of the open face area can be taken into consideration.

While not specifically illustrated, other combinations are also possible, including multiple sets of vertically moveable sash doors positioned adjacent one another along the width of the fume hood opening, with two or more sash doors being vertically moveable in adjacent tracks, much the same as residential casement windows.

In accordance with an important aspect of the fume hood controller 20, it is adapted to operate the fume hoods of various sizes and configurations as has been described, and it is also adapted to be incorporated into a laboratory room where several fume hoods may be located and which may have exhaust ducts which merge into a common exhaust manifold which may be a part of the building HVAC system. A fume hood may be a single self-contained installation and may have its own separate exhaust duct. In the event that a single fume hood is installed, it is typical that such an installation would have a variable speed motor driven blower associated with the exhaust duct whereby the speed of the motor and blower can be variably controlled to thereby adjust the flow of air through the fume hood. Alternatively, and most typically for multiple fume hoods in a single area, the exhaust ducts of each fume hood are merged into one or more larger exhaust manifolds and a single large blower may be provided in the manifold system. In such types of installations, control of each fume hood is achieved by means of separate dampers located in the exhaust duct of each fume hood, so that variation in the flow can be controlled by appropriately positioning the damper associated with each fume hood.

The fume hood controller is adapted to control virtually any of the various kinds and styles of fume hoods that are commercially available, and to this end, it has a number of input and output ports (lines, connectors or connections, all considered to be equivalent herein) that can be connected to various sensors that may be used with the controller. As shown in FIG. 2, it has digital output or DO ports which interface with a digital signal/analog pressure transducer with an exhaust damper as previously described, but it also has an analog voltage output port for controlling a variable speed fan drive if it is to be installed in that manner. There are five sash position sensor ports for use in sensing the position of both horizontally and vertically moveable sashes and there is also an analog input port provided for connection to an exhaust air flow sensor 49. A digital input port for the emergency switch is provided and digital output ports for outputting an alarm horn signal as well as an auxiliary signal is provided. An analog voltage output port is also provided for providing a volume of flow signal to the room controller 22. In certain applications where the exhaust air flow sensor is not provided, a wall velocity sensor indicative of face velocity may be utilized and an input port for such a signal is provided, but the use of such sensors is generally considered to be less accurate and is not the preferred embodiment. With these various input and output ports, virtually any type of fume hood can be controlled in an effective and efficient manner.

From the foregoing discussion, it should be appreciated that if the desired average face velocity is desired to be maintained and the sash position is changed, the size of the opening can be dramatically changed which may then require a dramatic change in the volume of air to maintain the average face velocity. While it is known to control a variable air volume blower as a function of the sash position, the fume hood controller apparatus improves on that known method by incorporating additional control schemes which dramatically improve the capabilities of the control system in terms of maintaining relatively constant average face velocity in a manner whereby reactions to perturbations in the system are quickly made.

To determine the position of the sash doors, a sash position sensor is provided adjacent each movable sash door and it is generally illustrated in FIGS. 7, 8 and 9. Referring to FIG. 8, the door sash position indicator comprises an elongated switch mechanism 80 of relatively simple mechanical design which preferably consists of a relatively thin polyester base layer 82 upon which is printed a strip of electrically resistive ink 84 of a known constant resistance per unit length. Another polyester base layer 86 is provided and it has a strip of electrically conductive ink 88 printed on it. The two base layers 82 and 86 are adhesively bonded to one another by two beads of adhesive 90 located on opposite sides of the strip. The base layers are preferably approximately five-thousandths of an inch thick and the beads are approximately two-thousandths of an inch thick, with the beads providing a spaced area between the conductive and resistive layers 88 and 84. The switching mechanism 80 is preferably applied to the fume hood by a layer of adhesive 92.

The polyester material is sufficiently flexible to enable one layer to be moved toward the other so that contact is made in response to a preferably spring biased actuator 94 carried by the appropriate sash door to which the strip is placed adjacent to so that when the sash door is moved, the actuator 94 moves along the switching mechanism 80 and provides contact between the resistive and conductive layers which are then sensed by electrical circuitry to be described which provides a voltage output that is indicative of the position of the actuator 94 along the length of the switching means. Stated in other words, the actuator 94 is carried by the door and therefore provides an electrical voltage that is indicative of the position of the sash door.

The actuator 94 is preferably spring biased toward the switching mechanism 80 so that as the door is moved, sufficient pressure is applied to the switching means to bring the two base layers together so that the resistive and conductive layers make electrical contact with one another and if this is done, the voltage level is provided. By having the switching means 80 of sufficient length so that the full extent of the travel of the sash door is provided as shown in FIG. 3, then an accurate determination of the sash position can be made.

It should be understood that the illustration of the switching mechanism 80 in FIGS. 3 and 5 is intended to be diagrammatic, in that the switching mechanism is preferably actually located within the sash frame itself and accordingly would not be visible as shown. The width and thickness dimensions of the switching mechanism are so small that interference with the operation of the sash door is virtually no problem. The actuator 94 can also be placed in a small hole that may be drilled in the sash door or it may be attached externally at one end thereof so that it can be in position to operate the switch 80. In the vertical moveable sash doors shown in FIGS. 3 and 6, a switching mechanism 80 is preferably provided in one or the other of the sides of the sash frame, whereas in the fume hoods having horizontally movable doors, it is preferred that the switching mechanism 80 be placed in the top of the tracks 68 so that the weight of the movable doors do not operate the switching mechanism 80 or otherwise damage the same.

Turning to FIG. 9, the preferred electrical circuitry which generates the position indicating voltage is illustrated, and this circuitry is adapted to provide two separate voltages indicating the position of two sash doors in a single track. With respect to the cross-section shown in FIG. 5, there are two horizontal tracks, each of which carries two sash doors and a switching mechanism 80 is provided for each of the tracks as is a circuit as shown in FIG. 9, thereby providing a distinct voltage for each of the four sash doors as shown.

The switching means is preferably applied to the fume hood with a layer of adhesive 92 and the actuator 94 is adapted to bear upon the switching means at locations along the length thereof. Referring to FIG. 7, a diagrammatic illustration of a pair of switching means is illustrated such as may occur with respect to the two tracks shown in FIG. 5. A switching mechanism 80 is provided with each track and the four arrows illustrated represent the point of contact created by the actuators 94 which result in a signal being applied on each of the ends of each switching means, with the magnitude of the signal representing a voltage that is proportional to the distance between the end and the nearest arrow. Thus, a single switching mechanism 80 is adapted to provide position indicating signals for two doors located in each track. The circuitry that is used to accomplish the voltage generation is shown in FIG. 9 and includes one of these circuits for each track. The resistive element is shown at 84 and the conductive element 88 is also illustrated being connected to ground with two arrows being illustrated, and represented the point of contact between the resistive and conductive elements caused by each of the actuators 94 associated with the two separate doors. The circuitry includes an operational amplifier 100 which has its output connected to the base of a PNP transistor 102, the emitter of which is connected to a source of positive voltage through resistor 104 into the negative input of the operational amplifier, the positive input of which is also connected to a source of positive voltage of preferably approximately five volts. The collector of the transistor 102 is connected to one end of the resistive element 84 and has an output line 106 on which the voltage is produced that is indicative of the position of the door.

The circuit operates to provide a constant current directed into the resistive element 84 and this current results in a voltage on line 106 that is proportional to the resistance value between the collector and ground which changes as the nearest point of contact along the resistance changes. The operational amplifier operates to attempt to drive the negative input to equal the voltage level on the positive input and this results in the current applied at the output of the operational amplifier varying in direct proportion to the effective length of the resistance strip 84. The lower portion of the circuitry operates the same way as that which has been described and it similarly produces a voltage on an output line 108 that is proportional to the distance between the connected end of the resistance element 84 and the point of contact that is made by the actuator 94 associated with the other sash door in the track.

Figure 10A:
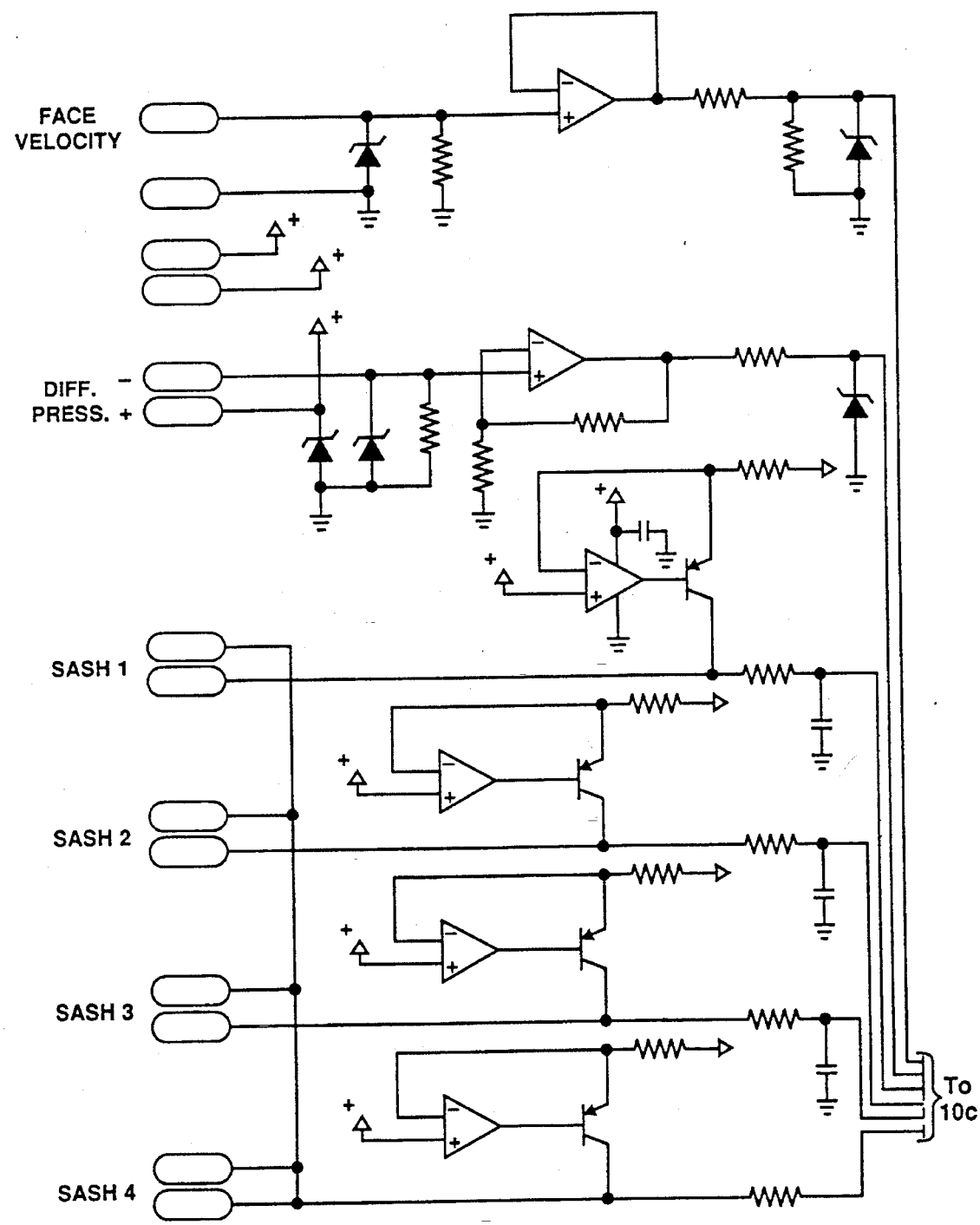
FIG. 10 is a block diagram illustrating the relative positions of FIGS. 10a, 10b, 10c, 10d and 10e to one another, and which together comprise a schematic diagram of the electrical circuitry for the fume hood controller means embodying the present invention.
Figure 10C:
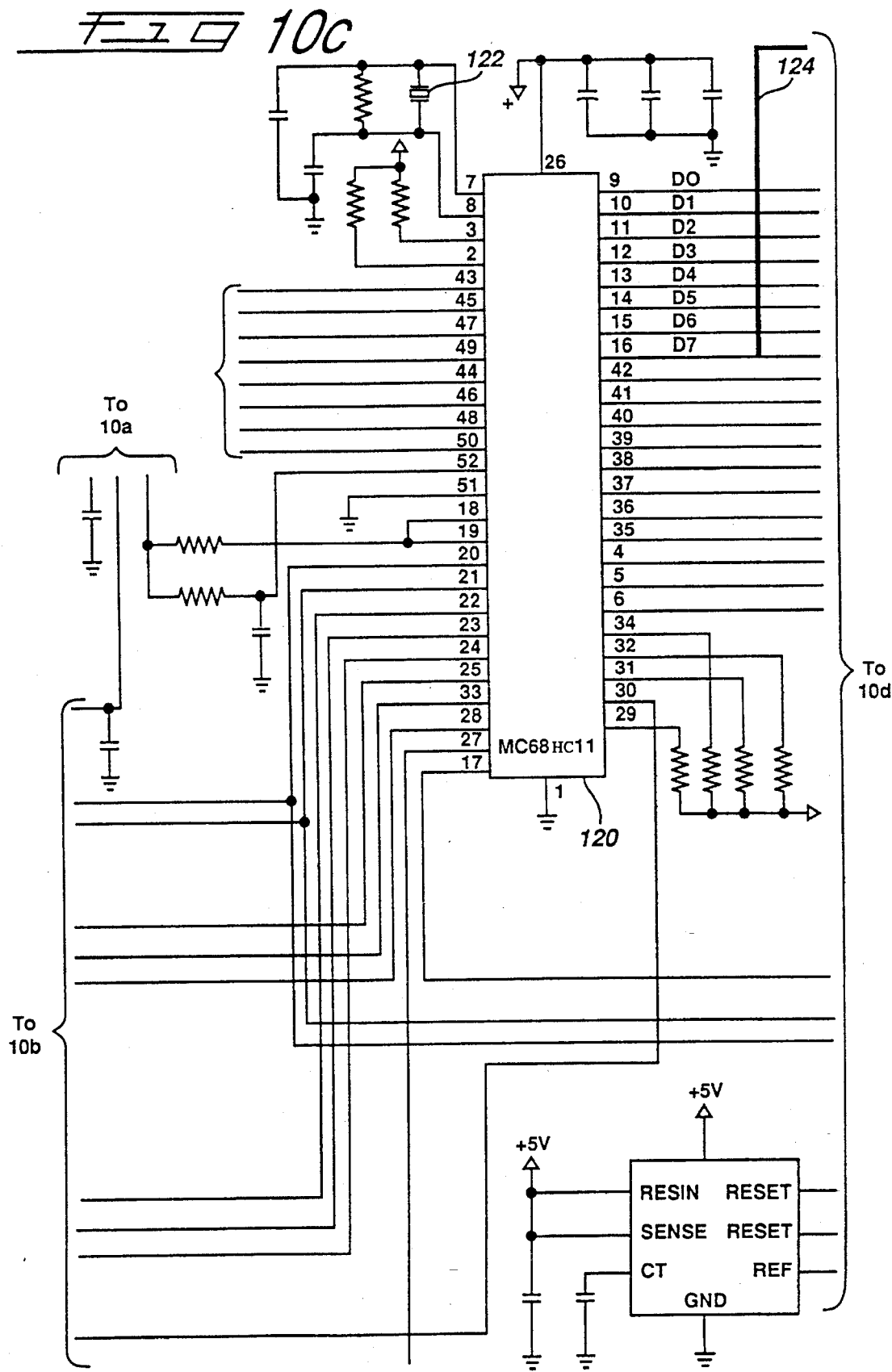
Figure 10D:
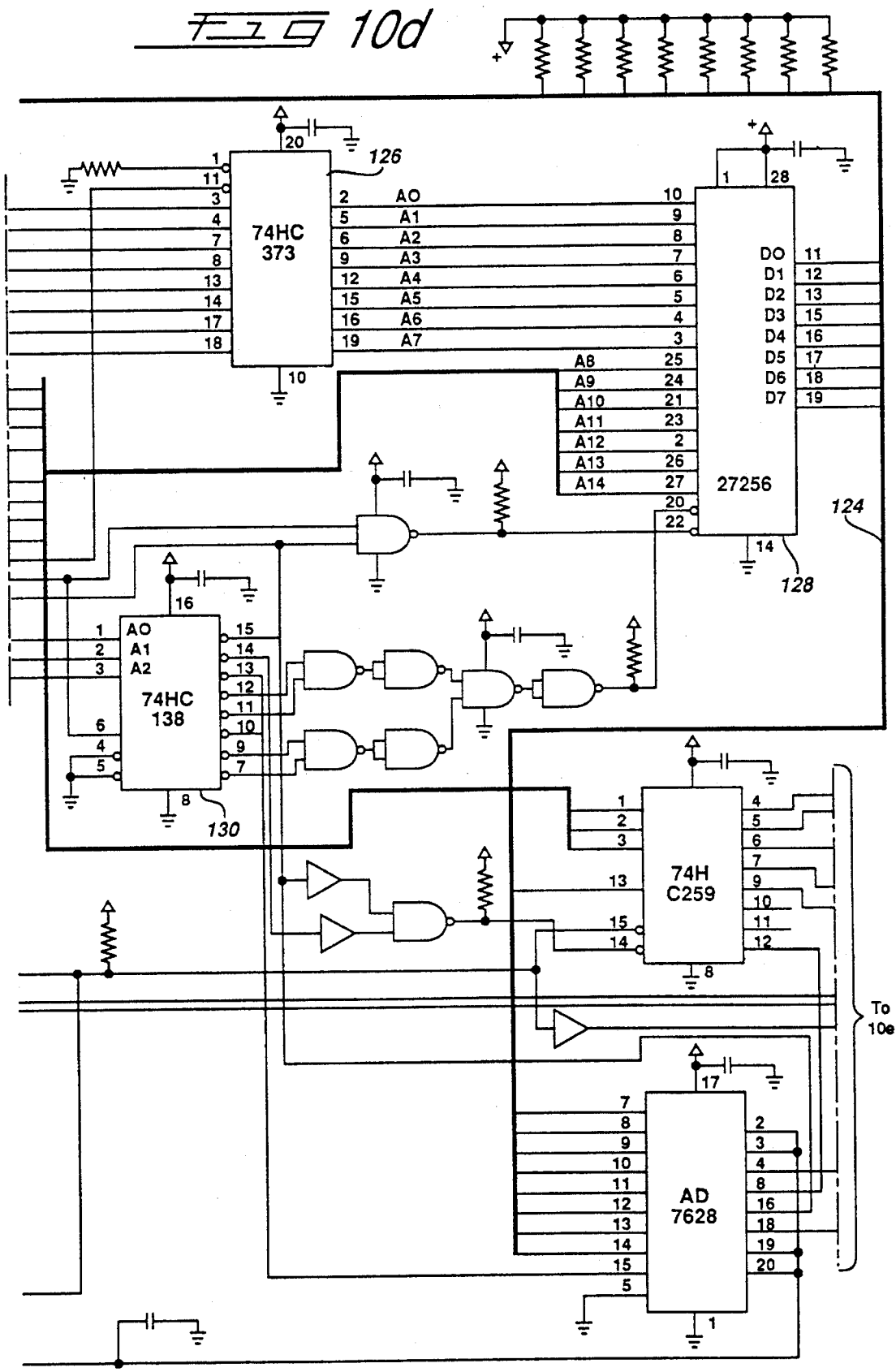
Figure 10E:
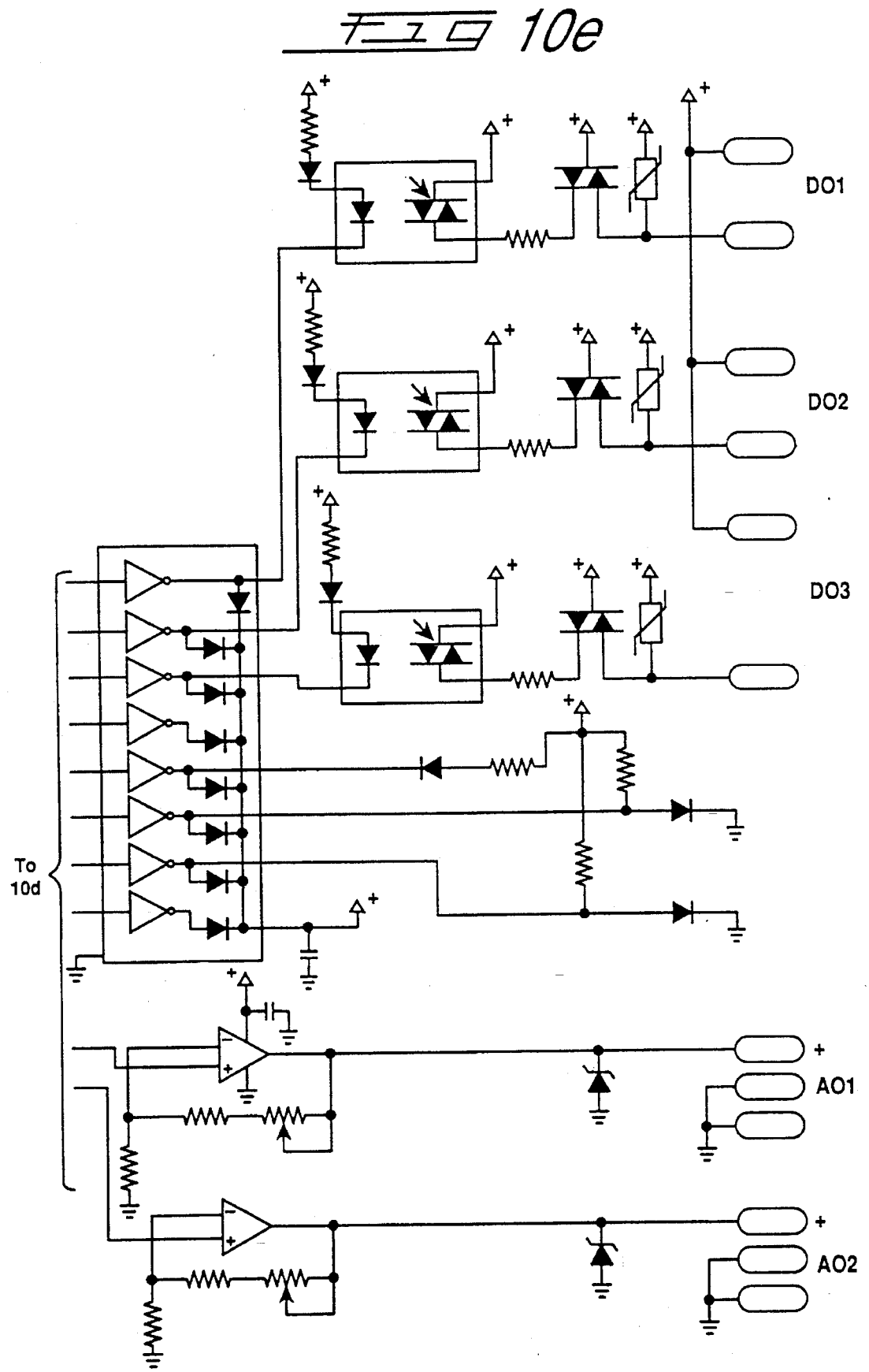

Referring to the composite electrical schematic diagram of the circuitry of the fume hood controller, if the separate drawings FIGS. 10a, 10b, 10c, 10d and 10e are placed adjacent one another in the manner shown in FIG. 10, the total electrical schematic diagram of the fume hood controller 20 is illustrated. The operation of the circuitry of FIGS. 10a through 10e will not be described in detail. The circuitry is driven by a microprocessor and the important algorithms that carry out the control functions of the controller will be hereinafter described. Referring to FIG. 10c, the circuitry includes a Motorola MC 68HC11 microprocessor 120 which is clocked at 8 MHz by a crystal 122. The microprocessor 120 has a databus 124 that is connected to a tri-state buffer 126 (FIG. 10d) which in turn is connected to an electrically programmable read only memory 128 that is also connected to the databus 124. The EPROM 128 has address lines A0 through A7 connected to the tri-state buffer 126 and also has address lines A8 through A14 connected to the microprocessor 120.

The circuitry includes a 3 to 8-bit multiplexer 130, a data latch 132 (see FIG. 10d), a digital-to-analog converter 134, which is adapted to provide the analog outputs indicative of the volume of air being exhausted by the fume hood, which information is provided to room controller 22 as has been previously described with respect to FIG. 2. Referring to FIG. 10b, an RS232 driver 136 is provided for transmitting and receiving information through the hand held terminal. The circuitry illustrated in FIG. 9 is also shown in the overall schematic diagrams and is in FIGS. 10a and 10b. The other components are well known and therefore need not be otherwise described.

As previously mentioned, the apparatus utilizes a flow sensor preferably located in the exhaust duct 70 to measure the air volume that is being drawn through the fume hood. The volume flow rate may be calculated by measuring the differential pressure across a multi-point pitot tube or the like. The preferred embodiment utilizes a differential pressure sensor for measuring the flow through the exhaust duct and the apparatus utilizes control schemes to either maintain the flow through the hood at a predetermined average face velocity, or at a minimum velocity in the event the fume hood is closed or has a very small by-pass area.

The fume hood controller can be configured for almost all known types of fume hoods, including fume hoods having horizontally movable sash doors, vertically movable sash doors or a combination of the two. As can be seen from the illustrations of FIGS. 2 and 10, the fume hood controller is adapted to control an exhaust damper or a variable speed fan drive, the controller being adapted to output signals that are compatible with either type of control. The controller is also adapted to receive information defining the physical and operating characteristics of the fume hood and other initializing information. This can be input into the fume hood controller by means of the hand held terminal which is preferably a lap top computer that can be connected to the operator panel 34. It should be appreciated that the day/night operation may be provided, but is not the preferred embodiment of the system; if it is provided, the information relating to such day/night operation should be included.

Operational information

1. Time of day;
2. Set day and night values for the average face velocity (SVEL), feet per minute or meters per second;
3. Set day and night values for the minimum flow, (MINFLO), in cubic feet per minute;
4. Set day and night values for high velocity limit (HVEL), F/m or M/sec;
5. Set day and night values for low velocity limit (LVEL), F/m or M/sec;
6. Set day and night values for intermediate high velocity limit (MVEL), F/m or M/sec;
7. Set day and night values for intermediate low velocity limit (IVEL), F/m or M/sec;
8. Set the proportional gain factor (KP), analog output per error in percent;
9. Set the integral gain factor (KI), analog output multiplied by time in minutes per error in percent;
10. Set derivative gain factor (KD), analog output multiplied by time in minutes per error in percent;
11. Set feed forward gain factor (KF) if a variable speed drive is used as the control equipment instead of a damper, analog output per CFM;
12. Set time in seconds (DELTIME) the user prefers to have the full exhaust flow in case the emergency button is activated;

13. Set a preset percent of last exhaust flow (SAFLOQ) the user wishes to have once the emergency switch is activated and DELTIME is expired.

The above information is used to control the mode of operation and to control the limits of flow during the day or night modes of operation. The controller includes programmed instructions to calculate the steps in paragraphs 3 through 7 in the event such information is not provided by the user. To this end, once the day and night values for the average face velocity are set, the controller 20 will calculate high velocity limit at 120% of the average face velocity, the low velocity limit at 80% and the intermediate limit at 90%. It should be understood that these percentage values may be adjusted, as desired. Other information that should be input include the following information which relates to the physical construction of the fume hood. It should be understood that some of the information may not be required for only vertically or horizontally moveable sash doors, but all of the information may be required for a combination of the same. The information required includes vertical segments, which is defined to be a height and width dimension that may be covered by one or more sash doors. If more than one sash door is provided for each segment, those doors are intended to be vertically moveable sash doors, analogous to a double sash residential window. The information to be provided includes the following:

14. Input the number of vertical segments;
15. Input the height of each segment, in inches;
16. Input the width of each segment, in inches;
17. Input the number of tracks per segment;
18. Input the number of horizontal sashes per track;
19. Input the maximum sash height, in inches;
20. Input the sash width, in inches;
21. Input the location of the sash sensor from left edge of sash, in inches;
22. Input the by-pass area per segment, in square inches;
23. Input the minimum face area per segment, in square inches;
24. Input the top lip height above the horizontal sash, in inches.

The fume hood controller 20 is programmed to control the flow of air through the fume hood by carrying out a series of instructions, an overview of which is contained in the flow chart of FIG. 11. After start-up and outputting information to the display and determining the time of day, the controller 20 reads the initial sash positions of all doors (block 150), and this information is then used to compute the open face area (block 152). If not previously done, the operator can set the average face velocity set point (block 154) and this information is then used together with the open face area to compute the exhaust flow set point (SFLOW) (block 156) that is necessary to provide the predetermined average face velocity given the open area of the fume hood that has been previously measured and calculated. The computed fume hood exhaust set point is then compared (block 158) with a preset or required minimum flow, and if the computed set point is less than the minimum flow, the controller sets the set point flow at the preset minimum flow (block 160). If it is more than the minimum flow, then it is retained (block 162) and it is provided to both of the control loops.

If there is a variable speed fan drive for the fume controller, i.e., several fume hoods are not connected to a common exhaust duct and controlled by a damper, then the controller will run a feed-forward control loop (block 164) which provides a control signal that is sent to a summing junction 166, which control signal represents an open loop type of control action. In this control action, a predicted value of the speed of the blower is generated based upon the calculated opening of the fume hood, and the average face velocity set point. The predicted value of the speed of the blower generated will cause the blower motor to rapidly change speed to maintain the average face velocity. It should be understood that while the feed forward functional aspect of the control is always operative, it provides correction principally only when the sash position has been changed and the change produces relatively large errors. After such corrections have been made, then a second control loop performs the dominant control action for maintaining the average face velocity constant in the event that a variable speed blower is used to control the volume of air through the fume hood.

After the sash position has been changed, and the new air volume has been established principally by the operation of the feed forward loop, then the proportional-integral-derivative control loop provides the control and this is accomplished by the set flow signal being provided to block 168 which indicates that the controller computes the error by determining the absolute value of the difference between the set flow signal and the flow signal as measured by the exhaust air flow sensor in the exhaust duct. Any error that is computed is applied to the control loop identified as the proportional-integral-derivative control loop (PID) to determine an error signal (block 170) and this error signal is compared with the prior error signal from the previous sample to determine if that error is less than a deadband error (block 172). If it is, then the prior error signal is maintained as shown by block 174, but if it is not, then the new error signal is provided to output mode 176 and it is applied to the summing junction 166. That summed error is also compared with the last output signal and a determination is made if this is within a deadband range (block 180) which, if it is, results in the last or previous output being retained (block 182). If it is outside of the deadband, then a new output signal is provided to the damper control or the blower (block 184). In the event that the last output is the output as shown in block 182, the controller then reads the measured flow (MFLOW) (block 186) and the sash positions are then read (block 188) and the net open face area is recomputed (block 190) and a determination made as to whether the new computed area less the old computed area is less than a deadband (block 192) and if it is, then the old area is maintained (block 194) and the error is then computed again (block 168). If the new area less the old area is not within the deadband, then the controller computes a new exhaust flow set point as shown in block 156.

One of the significant advantages is that the controller is adapted to execute the control scheme in a repetitive and extremely rapid manner. The exhaust sensor provides flow signal information that is inputted to the microprocessor at a speed of approximately one sample per 100 milliseconds and the control action described in connection with FIG. 11 is completed approximately every 100 milliseconds. The sash door position signals are sampled by the microprocessor every 200 milliseconds. The result of such rapid repetitive sampling and executing of the control actions results in extremely rapid operation of the controller. It has been found that movement of the sash will result in adjustment of the air flow so that the average face velocity is achieved within a time period of only approximately 3–4 seconds after the sash door reposition has been stopped.

In the event that the feed forward control loop is utilized, the sequence of instructions that are carried out to accomplish running of this loop is shown in the flow chart of FIG. 12, which has the controller using the exhaust flow set point (SFLOW) to compute the control output to a fan drive (block 200), which is identified as signal AO that is computed as an intercept point plus the set flow multiplied by a slope value. The intercept is the value which is a fixed output voltage to a fan drive and the slope in the equation correlates exhaust flow rate and output voltage to the fan drive. The controller then reads the duct velocity (DV) (block 202), takes the last duct velocity sample (block 204) and equates that as the duct velocity value and starts the timing of the maximum and minimum delay times (block 206) which the controller uses to insure whether the duct velocity has reached steady state or not. The controller determines whether the maximum delay time has expired (block 208), and if it has, provides the output signal at output 210. If the maximum delay has not expired, the controller determines if the absolute value of the difference between the last duct velocity sample and the current duct velocity sample is less than or equal to a dead band value (block 212). If it is not less than the dead band value, the controller then sets the last duct value as equal to the present duct value sample (block 214) and the controller then restarts the minimum delay timing function (block 216). Once this is accomplished, the controller again determines whether the maximum delay has expired (block 208). If the absolute value of the difference between the last duct velocity and the present duct velocity sample is less than the dead band, the controller determines whether the minimum delay time has expired which, if it has as shown from block 218, the output is provided at 210. If it has not, then it determines if the maximum delay has expired.

Turning to the proportional-integral-derivative or PID control loop, the controller runs the PID loop by carrying out the instructions shown in the flow chart of FIG. 13. The controller uses the error that is computed by block 168 (see FIG. 11) in three separate paths. With respect to the upper path, the controller uses the preselected proportional gain factor (block 220) and that proportional gain factor is used together with the error to calculate the proportional gain (block 222) and the proportional gain is output to a summing junction 224.

The controller also uses the error signal and calculates an integral term (block 226) with the integral term being equal to the prior integral sum (ISUM) plus the product of loop time and any error and this calculation is compared to limits to provide limits on the term. The term is then used together with the previously defined integral gain constant (block 230) and the controller than calculates the integral gain (block 232) which is the integral gain constant multiplied by the integration sum term. The output is then applied to the summing junction 224.

The input error is also used by the controller to calculate a derivative gain factor which is done by the controller using the previously defined derivative gain factor from block 234 which is used together with the error to calculate the derivative gain (block 236) which is the reciprocal of the time in which it is required to execute the PID loop multiplied by the derivative gain factor multiplied by the current sample error minus the previous sample error with this result being provided to the summing junction 224.

The control action performed by the controller 20 as illustrated in FIG. 13 provides three separate gain factors which provide steady state correction of the air flow through the fume hood in a very fast acting manner. The formation of the output signal from the PID control loop takes into consideration not only the magnitude of the error, but as a result of the derivative gain segment of control, the rate of change of the error is considered and the change in the value of the gain is proportional to the rate of change. Thus, the derivative gain can see how fast the actual condition is changing and works as an "anticipator" in order to minimize error between the actual and desired condition. The integral gain develops a correction signal that is a function of the error integrated over a period of time, and therefore provides any necessary correction on a continuous basis to bring the actual condition to the desired condition. The proper combinations of proportional, integral and derivative gains will make the loop faster and reach the desired conditions without any overshoot.

A significant advantage of the PID control action is that it will compensate for perturbations that may be experienced in the laboratory in which the fume hood may be located in a manner in which other controllers do not. A common occurrence in laboratory rooms which have a number of fume hoods that are connected to a common exhaust manifold, involves the change in the pressure in a fume hood exhaust duct that was caused by the sash doors being moved in another of the fume hoods that is connected to the common exhaust manifold. Such pressure variations will affect the average face velocity of those fume hoods which had no change in their sash doors. However, the PID control action may adjust the air flow if the exhaust duct sensor determines a change in the pressure. To a lesser degree, there may be pressure variations produced in the laboratory caused by opening of doors to the laboratory itself, particularly if the differential pressure of the laboratory room is maintained at a lesser pressure than a reference space such as the corridor outside the room, for example.

It is necessary to calibrate the feed forward control loop and to this end, the instructions illustrated in the flow chart of FIG. 14 are carried out. When the initial calibration is accomplished, it is preferably done through the hand held terminal that may be connected to the operator panel via connector 38, for example. The controller then determines if the feed forward calibration should perform a correction (block 242) and if it should, then the controller sets the analog output of the fan drive to a value of 20 percent of the maximum value, which is identified as value AO1 (block 244). The controller then sets the last sample duct velocity (LSDV) as the current duct velocity (CDV) (block 246) and starts the maximum and minimum timers (block 248).

The controller ensures the steady state duct velocity in the following way. First by checking whether the max timer has expired, and then, if the max timer has not expired, the controller determines if the absolute value of the last sample duct velocity minus the current duct velocity is less than or equal to a dead band (block 270), and if it is, the controller determines if the min timer has expired (block 272). If it has not, the controller reads the current duct velocity (block 274). If the absolute value of the last sample duct velocity minus the current duct velocity is not less than or equal to a dead band (block 270), then the last sample duct velocity is set as the current duct velocity (block 276) and the min timer is restarred (block 278) and the current duct velocity is again read (block 274).

In case either the max timer or min timer has expired, the controller then checks the last analog output value to the fan drive (252) and inquires whether the last analog output value was 70 percent of the maximum output value (block 254). If it is not, then it sets the analog output value to the fan drive at 70 percent of the max value AO2 (block 256) and the steady state duct velocity corresponding to AO1. The controller then repeats the procedure of ensuring steady state duct velocity when analog output is AO2 (block 258). If it is at the 70 percent of max value, then the duct velocity corresponds to steady state velocity of AO2 (block 258). Finally, the controller (block 262) calculates the slope and intercept values.

The result of the calibration process is to determine the duct flow at 20% and at 70% of the analog output values, and the measured flow enables the slope and intercept values to be determined so that the feed forward control action will accurately predict the necessary fan speed when sash door positions are changed.

The apparatus is adapted to rapidly calculate on a periodic basis several times per second, the uncovered or open area of a fume hood access opening that is capable of being covered by one or more sash doors as previously described. As is shown in FIG. 6, the actuator 94 is preferably located at the righthand end of each of the horizontally movable doors of which there are four in number as illustrated. The position indicating capability of the switching mechanism 80 provides a signal having a voltage level for each of the four doors which is indicative of the position of the particular sash door along its associated track. While the actuators 94 are shown at the righthand portion of the sash doors, it should be understood that they may be alternatively located on the lefthand portion, or they could be located at virtually any location on each door, provided that the relationship between the width of the door and the position of the actuator is determined and is input into the fume hood controller.

It should be appreciated that having the location of the actuators 94 at a common position, such as the right end, simplifies the calculation of the uncovered opening. While the fume hood shown in FIG. 6 is of the type which has four horizontally movable doors 76 that are housed within a frame structure 78 that itself is vertically movable, the fume hood controller apparatus is adapted to be used with up to four movable sash doors in a single direction, i.e., horizontally, and a perpendicularly movable sash door frame. However, there are five analog input ports in the controller for inputting position information regardless of whether it is horizontal or vertical and the controller can be configured to accommodate any combination of horizontally and vertically movable doors up to a total of five. To this end, it should be appreciated that there are vertically movable double sash doors in certain commercially available fume hoods, which configuration is not specifically shown in the drawings, with the double sash configuration being housed in a single frame structure that itself may be horizontally movable. The fume hood controller may treat the double sash door configuration in the vertical direction much the same as it operates with the horizontally movable sash doors that operate in two tracks as shown in FIG. 6.

Turning now to FIG. 15, the flow chart for the fume hood controller operation as it calculates the uncovered portion of the opening of the fume hood as illustrated for the embodiment of FIG. 6 with respect to the four horizontally movable doors. The flow chart operation would also be applicable for determining the uncovered area for the embodiment of FIG. 4 as well. The initial step is to read each sash door position (block 300). The next step is to sort the sash doors to determine the sash door positions relative to the left edge of the opening (block 302). It should be understood that the determination could be made from the right edge just as easily, but the left edge has conveniently been chosen. The apparatus then initializes the open area 304 as being equal to zero and then the apparatus computes the distance between the right edge of the sash door nearest the left edge of the opening and the right edge of the next sash door that is adjacent to it (block 306).

If the difference between the edges, as determined by the actuator location, is greater than the width of the sash (block 308), then the net open area is set to be equal to the net open area plus the difference minus the sash door width (block 310) and this value is stored in memory. If the difference is less than the sash door width, then the program proceeds to repeat for the next two pair of sash doors (block 312) as shown. In either event, then the program similarly repeats for the next two pairs of sash doors. After the controller performs its repetitions to calculate any open area between all of the sash doors, then the controller checks the distance between the right edge of the nearest sash door and the left track edge which is comparable to the left opening (block 314) and if the left difference is less than the sash door width (block 316) the controller then checks the distances between the left edge of the furthest sash door and the right edge of the track, i.e., the right opening 318. If the left difference is not less than the sash door width, then the net open area is determined to be equal to the net open area plus any left difference (block 320). The controller then determines if the right difference is less than the sash width (block 322) which, if it is, results in the net face area being equal to the net open area plus the fixed area (block 324) with the fixed area being the preprogrammed by-pass area, if any. If the right difference is not less than the sash width, then the controller determines that the net open area equals the net open area plus the right difference (block 326). In this way, the net open area is determined to be the addition between any open areas between sash doors and between the rightward sash door and the right edge of the opening and the difference between the left edge of the leftmost sash door and the left edge of the opening.

Turning now to FIG. 16, a flow chart of operation of the apparatus for determining the uncovered area of the opening for a fume hood which has multiple vertically moveable sash doors is shown. The controller, when initially configured, requires the input of the width of each segment, the number of such segments, the minimum face area, i.e., the by-pass area, plus any other residual open area with the sash doors closed, and the number of sash doors per segment (block 330). The controller then sets the area equal to zero (block 332) and begins the calculation for the first segment (block 334) and sets the old height equal to zero (block 336). It then begins with the first sash door (block 338) and reads the sash position (block 340), inputs the slope and intercept (block 342) from the prior calibration routine, and calculates the height for that sash door and segment (block 344). The apparatus then determines if it is sash door number 1, which if it is, forwards the height of the segment (block 348), obtains the width of the segment (block 350) and calculates the area by multiplying the height times the width (block 358). If the sash door was not the number 1 sash, then the controller determines if the height of the segment and sash was less than the old height, which if it is, then the height of the segment is set as the height (block 352) and the next sash door is made the subject of inquiry (block 354) and the old height is retrieved (block 356) and the controller returns to block 338 to repeat the calculations for the other segments and sash doors. After the sash doors for a segment have been considered, and the area of the segment determined (block 358), the controller determines if the area for the segment is less than the minimum flow area, and if it is, then the area is set to the minimum flow area (block 362). If it is greater than the minimum flow area, then the area for the segment is determined to be equal to the by-pass area plus the calculated area for the segment (block 364). The area is then calculated as the prior calculated area plus the area of the segment under consideration (block 366), and the controller then proceeds to consider the next segment (block 368). After all segments have been considered, the total area is obtained (block 370).

The apparatus is also adapted to determine the uncovered area of a combination of vertically and horizontally moveable sash doors, such as the fume hood illustrated in FIG. 6, which has four horizontally moveable sash doors that are contained in two sets of tracks, with the sets of tracks being contained in a frame structure which is itself vertically moveable. As previously mentioned, there is an upper lip 77 having a front thickness of about 2 inches, the exact dimension of which can vary with the manufacturer's design, a lower portion 79 of the frame 78, and a by-pass area 75. As may be appreciated, when the frame 78 is in its lowermost position, the entire by-pass area is "open" and air may be moved through it. As the frame is raised, the portion of the sash doors 76 which cover the opening will increasingly cover the by-pass area as shown. In the particular illustration of FIG. 6, the horizontally moveable doors overlap and are completely closed, but the frame is shown being slightly raised.

To determine the uncovered area of the combination sash door fume hood, the following specific steps are performed. The net open area, i.e., the uncovered area, is the sum of the vertical (hereinafter "V" in the equations) area and the horizontal (hereinafter "H") area:

Net Open Area=V area+H area with the horizontal area being determined as follows:

H area=H width * minimum of {panel Ht; Max of (panel Ht+top lip Ht+min. face Ht−sash Ht; 0)} with the H width comprising the previously described operation being performed with respect to the horizontally movable sash doors. The vertical area (V area) is determined by the following equation:

V area=Max of (Sash Ht * V width; minimum face area)

To complete the determination, the Net Face Area is then equal to the sum of the Net Open Area and the Fixed or by-pass Area:

Net Face Area=Net Open Area+Fixed Area

In accordance with the present invention, and referring to FIG. 17, a flow chart is illustrated which compensates for the presence of a grille or screen (FIG. 3, grille 65) that can provide resistance to air flow through the by-pass opening that is otherwise not blocked by the movement of the door of the fume hood. While the flow chart is illustrated for a fume hood of the type shown in FIG. 3, where only a single vertically movably door is provided, such a compensation factor is adapted for use with any number of doors that may be moved vertically and/or horizontally, with such movement varying the effective size of the by-pass opening.

In the manner as previously described, the vertical position of the sash is determined at block 372, and this information is forwarded to blocks 374 and 376 and summing block 378. The by-pass height data is provided by block 380 and resulting unblocked vertical dimension is determined at block 382, which provides a limiting minimum value if necessary and provides that value to a multiplier block 384 which multiplies the input value by a conductance factor from block 386, which ranges from approximately 0.1 to 1, and which is empirically determined. The conductance factor is a function of the resistance to flow that is provided by the presence of the grille or screen, and is different for different styles of grilles or screens. The conductance factor is preferably determined by adjusting the value of the same and measuring any deviation of the face velocity from the desired face velocity while operating the fume hood with the sash doors in various positions which change the size of the unblocked portion of said by-pass area. The value of the conductance factor is then optimized to reduce any deviation to a desired minimum.

The resulting product of block 384 is an effective by-pass vertical value that is applied to summing block 388. The vertical face calculation from block 374 is also applied to block 388 and the summed values are applied to switch logic block 390. If logic block passes the summed value to its output, then that value is multiplied in block 392 by the sash width from block 394 to obtain an effective area and it is added to any fixed open area provided by block 396 in summing block 398 to provide the total face area calculation. The failure detection block 376 operates to cause the switch logic block 390 to use the output from a ½ multiplier block 400 which has an input value of the maximum open height from a block 402 when a failure is detected. This value represents a forced value rather than the calculated value from the summing block 388.

From the foregoing detailed description, it should be appreciated that a fume hood controller has been shown and described that has superior capabilities in being able to accurately control the flow of air to maintain either a desired or minimum face velocity, and to compensate for the presence of a grille or screen or the like that may be located to cover a by-pass opening. The compensation for resistance to flow through the screen enables accurate control beyond mere calculation of the size of the by-pass opening that is not covered by the movement of the doors.

While various embodiments of the present invention have been shown and described, it should be understood that various alternatives, substitutions and equivalents can be used, and the present invention should only be limited by the claims and equivalents thereof.

Various features of the present invention are set forth in the following claims.

What is claimed is:

1. Apparatus for controlling the air flow through a fume hood to maintain a predetermined average face velocity through an uncovered portion of a face opening of a fume hood of the type which has at least one moveable sash door adapted to cover the opening as the fume hood sash door is moved and having a by-pass opening with a grille means overlying the opening, the by-pass opening being adapted to be at least partially blocked when at least one of said sash doors is moved to uncover said face opening, the fume hood being in communication with an exhaust duct for expelling air and fumes from the fume hood, said apparatus comprising:

means for detecting the position of each moveable sash door and generating a position signal that is indicative of the sash door position;

means responsive to said position signals for determining the size of the uncovered portion of the face opening;

means responsive to said position signals for determining the overall size of the unblocked portion of said by-pass area, and modifying said determined overall size by a conductance factor to compensate for air flow resistance resulting from said grille means, thereby resulting in an effective size of unblocked portion of said by-pass area;

means for measuring the actual flow of air through the exhaust duct and generating an actual flow signal that is indicative of the actual flow of air through the exhaust duct;

modulating means for varying the flow of air through the exhaust duct responsive to a control signal being received from a controller means;

controller means responsive to said determined size of said uncovered portion of the opening and the effective size of the unblocked portion of the by-pass area and said actual flow signal for controlling the flow modulating means to generate a desired flow rate signal value, said desired flow rate signal corresponding to a flow rate that is sufficient to maintain the predetermined average face velocity through the uncovered portion of the opening, said controller means comparing said desired flow rate signal and said actual flow rate signal and generating an error signal indicative of any error that exists, said controller means generating and outputting a control signal to said modulating means for selectively reducing said error signal to a predetermined minimum value.

2. Apparatus as defined in claim 1 wherein said conductance factor is a value greater than 0 and less than 1.

3. Apparatus as defined in claim 2 wherein said conductance factor is determined as a result of adjusting the value of the same and measuring any deviation of the face velocity from the desired face velocity while operating the apparatus with the sash doors in various positions which change the overall size of the unblocked portion of said by-pass area, and thereafter optimizing the value of said conductance factor to reduce said deviation to a desired minimum.

4. Apparatus for controlling a flow control means for controlling the air flow through a fume hood to maintain a predetermined average face velocity through an uncovered portion of a face opening of a fume hood of the type which has at least one moveable sash door adapted to cover the opening as the fume hood sash door is moved and having a by-pass opening with a grille means overlying the by-pass opening, the by-pass opening being adapted to be at least partially blocked responsive to movement of at least one of said sash doors, the fume hood being in communication with an exhaust duct for expelling air and fumes from the fume hood, said apparatus comprising:

means for determining the position of each of said sash doors and generating signals indicative thereof;

processing means including memory means for determining the size of the uncovered face opening responsive to said generated signals and to stored data in said memory means relating to the physical and operational parameters of the fume hood, said processing means being adapted to determine the overall size of the unblocked by-pass opening responsive to said generated signals and to said stored data;

said processing means modifying the overall size of said unblocked by-pass opening by a conductance factor to provide an effective size of said unblocked by-pass opening;

said processing means adding said size of the uncovered face opening and said effective size of said unblocked by-pass opening to provide a total effective opening size, and controlling said flow control means to provide the desired average face velocity utilizing said total effective opening size.

5. Apparatus as defined in claim 4 wherein the flow control means comprises a controller for varying the speed of operation of a variable speed blower.

6. Apparatus as defined in claim 4 wherein the flow control means comprises a controller for adjusting the position of a variable position damper means adapted to control the flow of air in the exhaust duct of the fume hood.

7. A method for controlling a flow control means for controlling the air flow through a fume hood to maintain a predetermined average face velocity through an uncovered portion of a face opening of a fume hood of the type which has at least one moveable sash door adapted to cover the opening as the fume hood sash door is moved and having a by-pass opening with a grille means overlying the by-pass opening, the by-pass opening being adapted to be at least partially blocked when at least one of said sash doors is moved to uncover said face opening, the fume hood being in communication with an exhaust duct for expelling air and fumes from the fume hood, said method comprising:

determining the position of each of said sash doors and generating signals indicative thereof;

determining the size of the uncovered face opening, responsive to said generated signals and to stored data in memory means of a processing means, said data relating to the physical and operational parameters of the fume hood;

determining the overall size of the unblocked by-pass opening responsive to said generated signals and to said stored data;

applying a conductance factor to the overall size of said unblocked by-pass opening to provide an effective size of said unblocked by-pass opening;

adding said size of the uncovered face opening and said effective size of said unblocked by-pass opening to provide a total effective opening size, and, controlling said flow control means to provide the desired average face velocity utilizing said total effective opening size.

8. A method as defined in claim 7 wherein said conductance factor is multiplied by said overall size of said unblocked by-pass opening, said conductance factor having a value greater than 0 and less than 1.

9. A method as defined in claim 8 wherein said conductance factor is determined as a result of adjusting the value of the same and measuring any deviation of the face velocity from the desired face velocity while operating the apparatus with the sash doors in various positions which change the overall size of the unblocked portion of said by-pass area, and thereafter optimizing the value of said conductance factor to reduce said deviation to a desired minimum.

10. A method for controlling the air flow through a fume hood to maintain a predetermined average face velocity through an uncovered portion of a face opening of a fume hood of the type which has at least one moveable sash door adapted to cover the opening as the fume hood sash door is moved and having a by-pass opening with a grille means overlying the opening, the by-pass opening being adapted to be at least partially blocked when at least one of said sash doors is moved to uncover said face opening, the fume hood being in communication with an exhaust duct for expelling air and fumes from the fume hood, said apparatus comprising:

detecting the position of each moveable sash door and generating a position signal that is indicative of the sash door position;

determining the size of the uncovered portion of the face opening with a processing means having an associated memory means utilizing said position signals and data relating to physical parameters stored in the memory means;

determining the overall size of the unblocked portion of said by-pass area utilizing said position signals and data relating to physical parameters stored in the memory means, and modifying said determined overall size by a conductance factor to compensate for air flow resistance resulting from said grille means, thereby resulting in an effective size of unblocked portion of said by-pass area;

adding said size of the uncovered face opening and the effective size of said unblocked by-pass opening to provide a total effective opening size, and measuring the actual flow of air through the exhaust duct, varying the flow of air through the exhaust duct responsive to said measured actual flow of air through the exhaust duct and the total effective size to provide the desired average face velocity.

11. A method as defined in claim 10 wherein said conductance factor is a value greater than 0 and less than 1.

12. A method as defined in claim 10 wherein said step of modifying said determined overall size comprises multiplying said overall size by said conductance factor.

13. Apparatus for controlling a flow control means for controlling the air flow through a fume hood to maintain a predetermined average face velocity through an uncovered portion of a face opening of a fume hood of the type which has at least one moveable sash door adapted to cover the opening as the fume hood sash door is moved and having a by-pass opening with a grille means overlying the by-pass opening, the by-pass opening being adapted to be at least partially blocked responsive to movement of at least one of said sash doors, the fume hood being in communication with an exhaust duct for expelling air and fumes from the fume hood, said apparatus comprising:

means for generating signals indicative of the position of each sash door;

control means for determining the size of the uncovered face opening and the overall size of the unblocked by-pass opening responsive to said generated signals;

said control means modifying the overall size of said unblocked by-pass opening by a factor to compensate for the change in flow characteristic resulting from the presence of said grille means;

said control means generating a signal indicating the total effective opening size from said generated signals and from said modified size of said unblocked by-pass opening, and controlling said flow control means to provide the desired average face velocity utilizing said signal indicating said total effective opening size.

14. Apparatus for controlling a flow control means for controlling the air flow through a fume hood to maintain a predetermined average face velocity through an uncovered portion of a face opening of a fume hood of the type which has at least one moveable sash door adapted to cover the opening as the fume hood sash door is moved and having a by-pass opening with a grill means overlying the by-pass opening, the by-pass opening being adapted to be at least partially blocked responsive to movement of at least one of said sash doors, the fume hood being in communication with an exhaust duct for expelling air and fumes from the fume hood, said apparatus comprising:

means for generating signals indicative of the position of each sash door and of the size of the unblocked by-pass opening;

control means adapted to receive said generated signals and provide a compensated by-pass opening signal that is a function of a changed flow characteristic through said by-pass opening due to the presence of said grille means;

said control means controlling said flow control means to provide the desired average face velocity utilizing said generated signals and said compensated by-pass opening signals.

15. Apparatus for controlling a flow control means for controlling the air flow through a fume hood to maintain a predetermined average face velocity through an uncovered portion of a face opening of a fume hood of the type which has at least one moveable sash door adapted to cover the opening as the fume hood sash door is moved and having a by-pass opening with a grill means overlying the by-pass opening, the by-pass opening being adapted to be at least partially blocked responsive to movement of at least one of said sash doors, the fume hood being in communication with an exhaust duct for expelling air and fumes from the fume hood, said apparatus comprising:

means for generating first signals indicative of the position of each sash door;

means for generating a second signal indicative of the size of the unblocked by-pass opening;

control means adapted to receive said first and second signals and provide a third signal that comprises a compensated by-pass opening signal that is a function of a changed flow characteristic through said by-pass opening due to the presence of said grille means;

said control means controlling said flow control means to provide the desired average face velocity utilizing said first and third signals.

\* \* \* \* \*